United States Patent
Oki et al.

(10) Patent No.: US 7,839,044 B2
(45) Date of Patent: Nov. 23, 2010

(54) ROTOR MAGNET, SPINDLE MOTOR COMPRISING THE SAME, RECORDING AND REPRODUCING APPARATUS, AND JIG FOR MANUFACTURING THE SAME

(75) Inventors: Yoichi Oki, Ehime (JP); Masahiro Jono, Ehime (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 12/053,069

(22) Filed: Mar. 21, 2008

(65) Prior Publication Data

US 2008/0231989 A1 Sep. 25, 2008

(30) Foreign Application Priority Data

Mar. 23, 2007 (JP) ............................. 2007-077577
Mar. 29, 2007 (JP) ............................. 2007-087453

(51) Int. Cl.
H02K 21/12 (2006.01)
(52) U.S. Cl. ...................... 310/156.43; 310/156.38; 310/156.62; 310/156.68; 310/156.82
(58) Field of Classification Search ............ 310/156.43, 310/156.25, 156.38, 156.44, 156.45, 156.62, 310/156.64, 156.68, 156.82; 335/302
See application file for complete search history.

(56) References Cited

U.S. PATENT DOCUMENTS 6,384,503 B1* 5/2002 Iwaki et al. ............ 310/156.47
6,817,507 B2* 11/2004 Yeon ........................... 226/188
2002/0117909 A1* 8/2002 Gomyo ....................... 310/67 R
2003/0168923 A1 9/2003 Gomyo et al.
2005/0253471 A1 11/2005 Enomoto et al.
2006/0197395 A1* 9/2006 Iguchi ................... 310/156.43

FOREIGN PATENT DOCUMENTS

| JP | 1-76007 | 5/1989 |
|---|---|---|
| JP | 2003-274602 | 9/2003 |
| JP | 2004-248461 | 9/2004 |
| JP | 2004-328978 | 11/2004 |

* cited by examiner

Primary Examiner—Quyen Leung
Assistant Examiner—Leda Pham
(74) Attorney, Agent, or Firm—Wenderoth, Lind & Ponack, L.L.P.

(57) ABSTRACT

An object of the present invention is to provide a rotor magnet that is capable of adjusting attraction of magnet that is mounted in a spindle motor, a spindle motor including the same, a recording and reproducing apparatus, and a jig for manufacturing the same, with a simple configuration. A rotor magnet is an approximately annular member that is attached to a rotor hub rotating around a shaft forming a part of a spindle motor. The rotor magnet is magnetized such that magnetization properties of axially top and bottom surfaces of the rotor magnet are different from each other.

7 Claims, 34 Drawing Sheets

MAGNETIZED STATE OF MAGNET
(MAGNET VIEWER)

SINGLE MAGNET
(AFTER MAGNETIZATION)

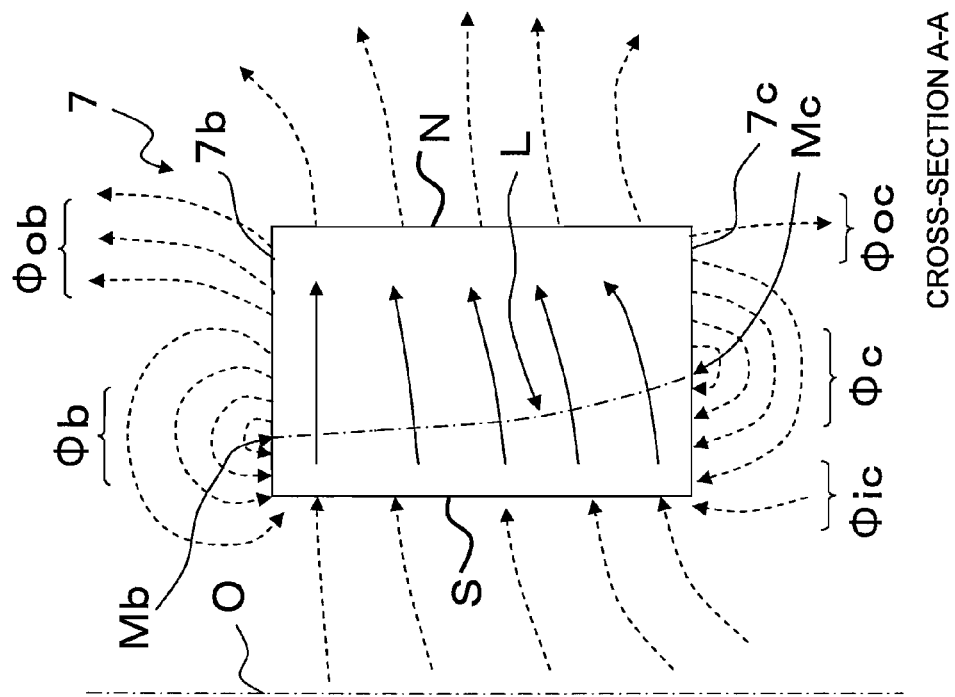
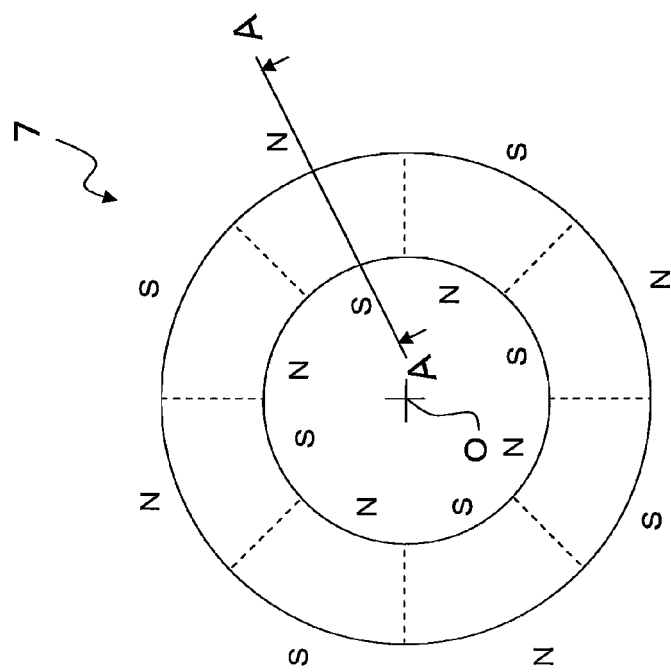
Fig. 2B
Fig. 2A

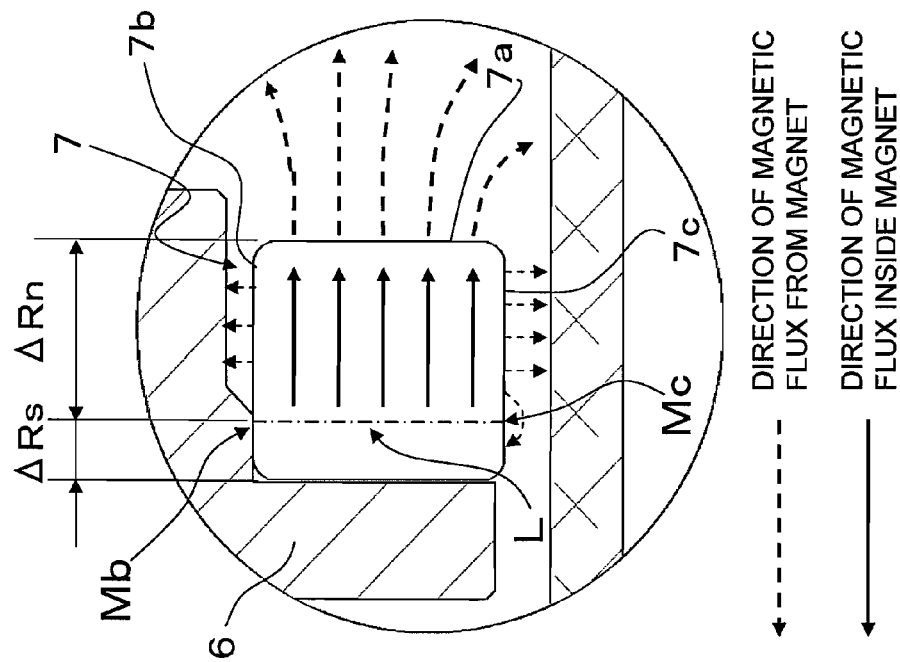
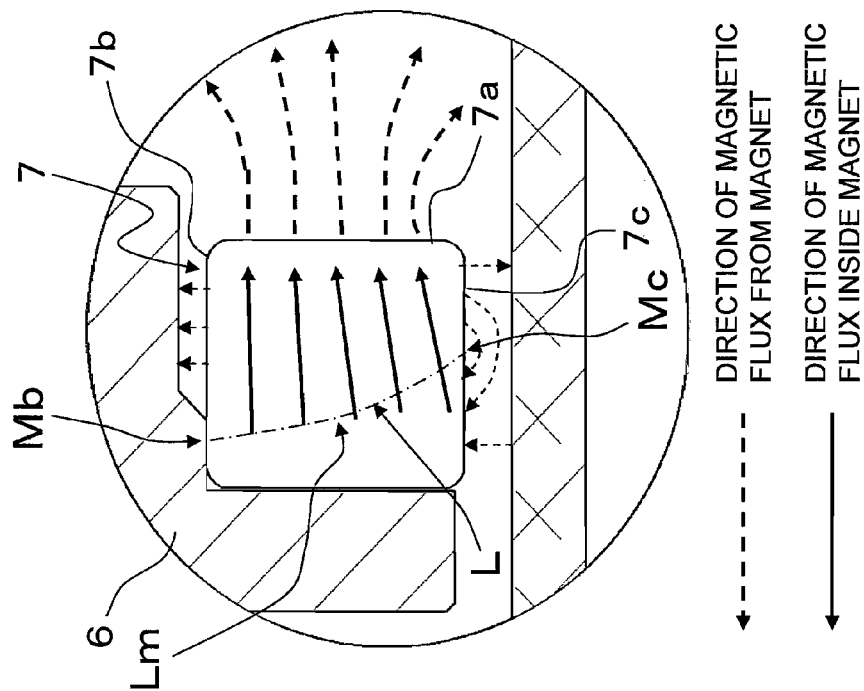
Fig. 5A
Fig. 5B

ENLARGED DIAGRAM OF PART A

BOTTOM OF MAGNET

TOP OF MAGNET

ENLARGED DIAGRAM OF PART A

ROTOR MAGNET, SPINDLE MOTOR COMPRISING THE SAME, RECORDING AND REPRODUCING APPARATUS, AND JIG FOR MANUFACTURING THE SAME

BACKGROUND OF THE INVENTION

1. Field of the Invention

The present invention relates to a rotor magnet that is configured to be mounted in a spindle motor, a spindle motor comprising the same, a recording and reproducing apparatus, and a jig for manufacturing the same.

2. Description of the Related Art

With the trend of reduction in size and weight of machines that a device such as a hard disk drive (HDD), a magneto-optical (MO) disk drive, an optical disk drive, and a floppy disk drive (FDD) is mounted therein, a variety of demands, such as increase in capacity and reduction in size, thickness, and cost, have been recently increasing for the machines.

For example, Japanese Patent Application Publication No. JP-A-2004-328978 (published on Nov. 18, 2004) discloses a brushless motor that is capable of being formed in a small size and is capable of reducing electric power consumption. Here, the brushless motor has a configuration that a ring made of a magnetic substance is attached to an end of a rotor magnet on a base plate side. According to the configuration, it is possible to reduce leakage magnetic flux from the rotor magnet to the base plate side. Therefore, even when the rotor magnet and the base plate are disposed adjacent to each other, it is possible to avoid an increase of load and inhibit electric power consumption. It is also possible to form a low-profile device with this configuration.

Also, Japanese Patent Application Publication No. JP-A-2003-274602 (published on Sept. 26, 2003) discloses a spindle motor that is provided with a magnetic attraction plate. Here, the magnetic attraction plate includes an axially opposed portion that is opposed to a rotor magnet in an axial direction, and a radially opposed portion that is opposed to the rotor magnet in a radius direction. According to the configuration, it is possible to efficiently use the magnetic flux from the rotor magnet as the magnetic attraction by means of both opposed portions. Accordingly, even when a simple and small spindle motor is formed, it is possible to efficiently secure the magnetic attraction by the magnetic attraction plate with respect to a rotational body.

Also, as an example of a method of magnetizing a rotor magnet, Japanese Utility Model Application Publication No. JP-U-H01-76007 (published on May 23, 1989) discloses a method of magnetizing a rotor magnet from the inner peripheral side thereof. In a normal magnetizing process, a magnetizing yoke is inserted into a rotor magnet, and the outer periphery of the magnetizing yoke engages with the inner periphery of the rotor magnet. Next, a yoke member is attached to and engages with the outer periphery of the rotor magnet.

Here, the yoke member is made of ring-shaped magnetic material and is formed to have constant inner and outer diameters. Next, pulse current is applied to a coil of the magnetizing yoke, and thus the rotor magnet is magnetized. The main body of the rotor magnet that is magnetized as described above is kept in an approximately uniformly-magnetized condition in a rotational axis direction.

Furthermore, Japan Patent Application Publication JP-A-2004-248461 discloses a spindle motor having a configuration that the diameter of an end portion of a rotor magnet is formed to be less than that of a center portion thereof and accordingly a gap between the rotor magnet and a stator core is formed to be gradually greater toward the end portion of rotor magnet, and a configuration that an end of a rotor magnet is weakly magnetized with a magnetizing yoke formed to have height less the length of the rotor magnet in a rotational axis direction. According to the configuration, the amount of magnetization in the end portion of the rotor magnet in the rotational axis direction is smaller than that of the center portion thereof. Therefore, it is possible to reduce the magnetic attraction that will be a cause of vibration when a minute misalignment is produced between the stator core and the rotor magnet in the axial direction. Accordingly, it is possible to reduce vibration and noise, which result from inhibition of electric power consumption and magnetic attraction.

However, the above described conventional motors have the following problems.

Specifically, in the motors disclosed in the above described publication Nos. JP-A-2004-328978 and JP-A-2003-274602, with the trend of a low-profile motor, it is getting difficult to secure an axial space to which members (e.g., a ring and a magnetic plate) for adjusting attraction of a magnet are attached. Thus, these members might become a factor in preventing production of a low-profile motor. In addition, it is required to attach members (e.g., a ring and a magnetic plate) for adjusting attraction of a magnet to a motor. Therefore, a manufacturing process might become complicated and the manufacturing cost might be increased.

Also, according to the rotor magnet of the spindle motor disclosed in the Japan Patent Application Publication JP-A-2004-248461, the amount of magnetization in the end portion of the rotor magnet in the rotational axis direction becomes smaller than that in the center portion thereof. Because of this, when diameter of the end portion of the rotor magnet is formed to be smaller than that of the center portion thereof, a large gap is produced between the stator core and the end portion of the rotor magnet in the rotational axis direction. Accordingly, magnetic resistance is increased and thus torque to be generated in the motor is reduced, and electric current consumption is increased. On the other hand, when a magnetizing yoke with length (i.e., height) shorter (i.e., lower) than length (i.e, height) of the rotor magnet in the rotational axis direction is used, magnetic field in magnetization will be unstably generated in connections of the magnetizing coil, which is disposed on both end portions of the magnetizing yoke in the rotational axis direction. Accordingly, marked variation is generated in magnetization and thus vibration and noise are increasingly produced. Furthermore, there has been a problem that the energy product of the rotor magnet is not efficiently exerted because of the incomplete magnetization in the both end portions of the rotor magnet in the axial direction, and electric current consumption is increased by the reduction of the torque to be generated in the motor.

FIGS. 31 and 32 illustrate a method of magnetizing a rotor magnet 507 that is configured to be used in an inner rotor type spindle motor in which a stator core is disposed on the outer periphery of a rotor magnet. In this case, the rotor magnet is generally magnetized in a condition that a magnetizing yoke 512 having a magnetizing coil 513 wound therearound is disposed on the outer periphery of the rotor magnet 507. Note that a stator core is disposed on the outer periphery of the rotor magnet 507 when mounted in a motor. Here, as illustrated in FIGS. 30, 33A and 33B, when the rotor magnet 507 is magnetized from the outer peripheral side with the magnetizing yoke 512 that has length (i.e., height) longer (i.e., larger) than length (i.e., height) of the rotor magnet 507 in the rotational axis direction for the purpose of effectively magnetizing the end portion of the rotor magnet 507, the rotor magnet 507 is magnetized in a externally expanding direction with respect to a stator core 508. Accordingly, attraction is increased on the bottom end portion, and leakage magnetic flux is increased on the top end portion.

An object of the present invention is to provide a rotor magnet that is capable of adjusting attraction of a magnet to be mounted in a spindle motor, a spindle motor comprising the same, a recording and reproducing apparatus, and a jig for manufacturing the same, with a simple configuration.

SUMMARY OF THE INVENTION

A rotor magnet of the first invention is magnetized such that adjacent magnetic poles are different from each other. The rotor magnet is configured to be attached to a rotational side member that is configured to rotate around a rotational axis of a spindle motor, and includes an approximately annular main body. In addition, a magnetic polar boundary line circumferentially extending on one of end portions of the main body in a rotational axis direction is positioned radially-outside a magnetic polar boundary line circumferentially extending on the other of end portions of the main body in the rotational axis direction.

Here, the magnetic polar boundary line means a boundary area (magnetic polar boundary area) between magnetic poles on the surface of the rotor magnet. Specifically, when a magnet viewer (note that the magnet viewer has a configuration that magnetic fluid is sealed therein by a transparent sheet while the magnetic fluid is capable of freely moving), for example, is made contact with the end portion of the magnetized rotor magnet (see FIG. 1A, the magnetic fluid is about to be absorbed depending on the strength of the magnetic pole of the rotor magnet as illustrated in FIG. 1B). Therefore, the magnetic fluid gathers around the magnetic pole, and thus the magnetic pole appears in a deep color. However, the magnetic fluid is not absorbed in the boundary area between a north (N) pole and a south (S) pole, and thus the boundary area appears in a light color. The magnetic polar boundary line described in the present invention means the boundary area of magnetic poles, which is viewable as a light color area.

Here, a rotor magnet having the following configuration is used. That is, magnetic polar boundary lines, which circumferentially extend on the top and bottom surfaces in a direction along the rotational axis, are positioned in radially-different positions.

Here, a member, such as a rotor hub having a disk mount surface on which a disk is mounted, is used as a rotational side member to which a rotor magnet is attached. In addition, the circumferentially extending magnetic polar boundary lines, which are positioned on the main body of the rotor magnet, are located in radially-different positions. Accordingly, magnetic force in a predetermined direction varies, for example, when distribution of magnetic flux is changed in one end portion and the other end portion of the rotor magnet in the rotational axis direction.

According to the rotor magnet of the present invention, the magnetic polar boundary lines, which are extending in axially different positions of the approximately annular shaped main body, are positioned in radially-different positions. In other words, the rotor magnet is formed such that the magnetic force in a predetermined direction varies, for instance.

Here, the magnetic flux condition in which the circumferentially extending magnetic polar boundary lines are positioned in radially-different positions will be explained with reference to FIGS. 2A and 2B. FIG. 2B is a cross-sectional view of a rotor magnet (see FIG. 2A) for which multi-polar magnetization is circumferentially performed from the outer peripheral side of the rotor magnet with respect to a center axis O. In addition, FIG. 2B illustrates a magnetic flux condition in an A-A section of the rotor magnet. Here, the outer peripheral side of the A-A section is magnetized to be the N pole, and the inner peripheral side thereof is magnetized to be the S pole. A magnetic polar boundary line Mb, which circumferentially extends on a top surface 7b of a rotor magnet 7, is positioned on the inner peripheral side in the radius direction, while a magnetic polar boundary line Mc circumferentially extending on a bottom surface 7c is positioned radially-outside the magnetic polar boundary line Mb. When the magnet is cut in the cross-section and the section is observed with a magnet viewer, it is possible to observe a magnetic polar boundary line L that connects the magnetic polar boundary lines Mb and Mc and functions as a boundary of the N pole and the S pole.

Also, the magnetic flux in the vicinity of the circumferentially extending magnetic polar boundary line Mb flows from the N pole of the top surface 7b into the S pole of the adjacent top surface as a magnetic flux phi-b (Φb) while tracing a small magnetic loop. On the other hand, the magnetic flux flowing out of the N pole externally separated from the circumferentially extending magnetic polar boundary line Mb flows upward from the top surface as a leakage magnetic flux phi-ob (Φob) while tracing a large magnetic loop because the S pole is disposed on a remote position. For example, if a steel plate made of magnetic material is approached to the top surface 7b, the magnetic material is attracted by means of the leakage magnetic flux Φb.

Also, magnetic flux phi-c (Φc) and magnetic fluxes phi-oc (Φoc) and phi-ic (Φic) are generated in the vicinity of a magnetic polar boundary line Mc circumferentially extending on the bottom surface 7c. Here, the magnetic flux Φc flows from the N pole into the S pole while tracing a small magnetic loop, and magnetic fluxes Φoc and Φic flow in and out of the bottom while tracing a large magnetic loop. However, the magnetic polar boundary line Mc, which circumferentially extends on the bottom surface 7c, is positioned in a radially-outside position. Therefore, the amount of the leakage fluxes Φic and Φoc is less than that of the leakage flux Φob on the top surface. Accordingly, the force of attracting the steel plate separated from the surface at the same distance becomes small on the bottom surface 7c side. In other words, the circumferentially extending magnetic polar boundary line is positioned radially-outside the bottom surface 7c. Therefore, even when magnetic material is approached to the surface, attraction becomes smaller on the bottom surface 7c, compared to the top surface 7b.

Because of this, it is possible to easily adjust attraction in a predetermined direction, which is generated by the rotor magnet configured to be mounted in a spindle motor, only by adjusting a magnetization condition and by changing an attachment direction without disposing a separate member (e.g., a ring member). As a result, it is possible to apply it to spindle motors with a variety of purposes without adding a separate member. Here, the spindle motors with a variety of purposes include a spindle motor that is configured to be mounted in a mobile machine in which an impact-resistance property is desired to be secured by enhancing attraction, a spindle motor that is configured to be mounted in a server motor in which a long-lived property is desired to be achieved by reducing attraction, and a spindle motor in which the amount of the leakage magnetic flux toward the hub side is desired to be reduced.

A spindle motor of a second invention includes the rotor magnet of the first invention, a rotational side member to which the rotor magnet is attached, a stator core that has a stator coil wound therearound and is disposed to be opposed to the rotor magnet in a radial direction, a base that retains the stator core, and a bearing unit that rotatably and relatively supports a rotational side member with respect to the base.

According to the second invention, the above described rotor magnet is mounted in the spindle motor. Therefore, it is possible to easily adjust attraction in a predetermined direction, which is generated by the rotor magnet, only by changing an attachment direction without disposing a separate member (e.g., a ring member). As a result, it is possible to apply it to spindle motors with a variety of purposes without adding a separate member. Here, the spindle motors with a variety of purposes include a spindle motor that is configured to be mounted in a mobile machine in which an impact-resistance property is desired to be secured by enhancing attraction, a spindle motor that is configured to be mounted in a server motor in which a long-lived property is desired to be achieved by reducing attraction, and a spindle motor in which the amount of the leakage magnetic flux toward the hub side is desired to be reduced.

A spindle motor of a third invention is the spindle motor of the second invention, and the rotor magnet is attached to the spindle motor such that the magnetic polar boundary line circumferentially extending on an end portion on the base side is positioned radially-outside a magnetic polar boundary line circumferentially extending on an end portion on the opposite side of the base.

With the configuration, it is possible to reduce abrasion to be generated between members of a thrust bearing unit during start-up or the like by reducing attraction that works axially-downward when magnetization is performed from the outer peripheral side. As a result, it is possible to preferably apply the configuration to a spindle motor for a server motor for which not an impact-resistance property but a long-lived property is demanded. In addition, it is possible to reduce electric current loss and achieve low power consumption because of the lower level attraction.

On the other hand, when magnetization is performed from the inner peripheral side, it is possible to increase axially-downward attraction. Therefore, it is possible to produce a configuration with high-stiffness and high-toughness against externally applied impact. As a result, it is possible to preferably apply the configuration to a spindle motor that is configured to be mounted in a mobile machine for which an impact-resistance property is demanded. Furthermore, even when the configuration is applied to a low-profile spindle motor in a mobile machine or the like, for example, it is possible to reduce leakage magnetic flux toward the disk-shaped medium side because magnetic flux on a rotational side member side (e.g., a hub side) is small.

A spindle motor of a fourth invention is the spindle motor of the second invention, and the rotor magnet is attached to the spindle motor such that the magnetic polar boundary line circumferentially extending on an end portion on the base side in the rotational axis direction is positioned radially-inside a magnetic polar boundary line circumferentially extending on an end portion on the opposite side of the base in the rotational axis direction.

Accordingly, when magnetization is performed from the outer peripheral side, it is possible to increase axially-downward attraction. Therefore, it is possible to produce a configuration with high-stiffness and high-toughness against externally applied impact. As a result, it is possible to preferably apply the configuration to a spindle motor that is configured to be mounted in a mobile machine for which an impact-resistance property is demanded. Furthermore, even when the configuration is applied to a low-profile spindle motor in a mobile machine or the like, for example, it is possible to reduce leakage magnetic flux toward the disk-shaped medium side because magnetic flux on a rotational side member side (e.g., a hub side) is small.

On the other hand, when magnetization is performed from the outer peripheral side, it is possible to reduce abrasion to be generated between members of a thrust bearing unit during start-up or the like by reducing axially-downward attraction. As a result, it is possible to preferably apply the configuration to a spindle motor for a server motor for which not an impact-resistance property but a long-lived property is demanded. In addition, it is possible to reduce electric current loss and achieve low power consumption because of the lower level attraction.

An information device of a fifth invention includes the spindle motor of a second invention, one of a disk-shaped recording medium, a rotation head, and a polygon mirror, each of which are attached to the spindle motor as an added member.

Accordingly, with the configuration that the above described spindle motor is mounted in the information device, it is possible to easily adjust attraction in a predetermined direction, which is generated by the rotor magnet, only by changing an attachment direction without disposing a separate member (e.g., a ring member). As a result, it is possible to provide an information device that is capable of achieving purposes of a variety of devices without adding a separate member. Here, the variety of devices include, for example, a mobile machine in which an impact-resistance property is desired to be secured by enhancing attraction, a hard disk drive for a server in which a long-lived property is desired to be achieved by reducing attraction, and a hard disk drive in which the amount of the leakage magnetic flux toward the hub side is desired to be reduced.

A rotor magnet manufacturing jig of a sixth invention is a manufacturing jig for the rotor magnet of the first invention, and includes a magnetizing yoke, a yoke member, a first support portion, and a second support portion. The magnetizing yoke is disposed to make contact with the inner peripheral surface or the outer peripheral surface of the rotor magnet, and is configured to magnetize the rotor magnet. The yoke member is disposed to make contact with the outer peripheral surface or the inner peripheral surface of the rotor magnet, and is made of magnetic material. The first support portion supports one of end portions of the main body of the rotor magnet in the rational axis direction, and is made of magnetic material. The second support portion supports the other of end portions of the main body of the rotor magnet in the rational axis direction, and is made of non-magnetic material.

Here, one of end portions and the other of end portions of the above described rotor magnet in the rotational axis direction are supported by the first support portion made of magnetic material and the second support portion made of non-magnetic material, respectively.

Here, the manufacturing jig may be an outer periphery magnetization typed manufacturing jig in which the magnetizing yoke is disposed on the outer peripheral side of the rotor magnet, or an inner periphery magnetization typed manufacturing jig in which the magnetizing yoke is disposed on the inner peripheral side of the rotor magnet. In addition, the yoke member may be a hollow member or a solid-core member.

Accordingly, magnetic flux applied by the magnetic yoke flows toward the magnetic material through the rotor magnet. Because of this, it is possible to magnetize the rotor magnet in a condition that the magnetic flux is not uniformly applied along the radial direction but is applied in different directions on both end portions in the rotational axis direction. Therefore, it is possible to easily manufacture a rotor magnet with different magnetization properties in the rotational axis direction.

Note that it is preferable to change a position, area, or the like of a surface making contact with magnetic material on one of end portions of the rotor magnet in the rotational axis direction for the purpose of adjusting radial positions of the circumferentially extending magnetic polar boundary lines Mb and Mc. Because of this, it is possible to easily manufacture a rotor magnet in which a circumferentially extending magnetic polar boundary line is located in an appropriate radial position depending on a property of a recording and reproducing apparatus to which the rotor magnet is configured to be mounted.

A rotor magnet manufacturing jig of a seventh invention is a manufacturing jig for the rotor magnet of an sixth invention, and the first support portion is integrally formed with the yoke member.

The first support portion that supports one of end portions of the rotor magnet in the rotational axis direction is herein integrally formed with the yoke member.

Here, in a case of a manufacturing jig for the outer periphery magnetization, a large-diameter portion of the yoke member, which functions as the first support portion, is a portion having diameter greater than that of a small-diameter portion of the yoke member that makes contact with the inner peripheral portion of the rotor magnet, and supports an annular rotor magnet inserted along the small-diameter portion by one of end portions in the rotational axis direction. Note that the small-diameter portion of the yoke member functions as the first support portion in a case of a manufacturing jig for the inner periphery magnetization.

Because of this, it is possible to easily manufacture a rotor magnet with different magnetization properties in the rotational axis direction with a simple configuration without increasing the number of members.

A rotor magnet of an eighth invention is magnetized such that circumferentially adjacent magnetic poles are different from each other. The rotor magnet is configured to be attached to a rotational side member that is configured to rotate around a rotational axis of a spindle motor to be opposed to the inner periphery or the outer periphery of a stator core, and includes an approximately annular main body. On at least one of the end portions of the main body in the axial direction, an N-pole magnetized portion of the main body is magnetized to have a radial magnetizing component flowing from the rotor magnet itself to the stator core opposed to the rotor magnet and an axial magnetizing component flowing toward a center portion in the axial direction, and an S-pole magnetized portion is magnetized to have an axial magnetizing component flowing outward in the axial direction.

Because of this, it is possible to effectively use the energy product of the rotor magnet and reduce the amount of leakage magnetic flux that flows through the magnetic attraction plate from a portion of the end surface of the rotor magnet, which is not opposed to the stator core on the base side. Therefore, it is possible to inhibit attraction even when a gap between the rotor magnet and the magnetic attraction plate is reduced by producing a low-profile motor. As a result, loss torque in a direction in which the rotor part is prevented from rotating is reduced, and thus it is possible to reduce electric current consumption.

A rotor magnet manufacturing jig of a ninth invention is a manufacturing jig for the above described rotor magnet, and includes a magnetizing yoke, and first and second yoke portions. The magnetizing yoke is disposed to make contact with the inner peripheral surface or the outer peripheral surface of the rotor magnet on a side opposed to the stator core. The magnetizing yoke has dimension greater than axial length of the rotor magnet, and has a magnetizing coil wound therearound. The first yoke portion is made of magnetic material and makes contact with at least a part of one of end portions of the rotor magnet. The second yoke is made of magnetic material and makes contact with at least a part of the other of end portions of the rotor magnet.

Accordingly, it is possible to reduce the influence of a variation of a magnetic field on both end portions of the magnetizing yoke in the vicinity of the rotor magnet to be magnetized. Furthermore, it is possible to magnetize the rotor magnet such that both end portions of the rotor magnet on the peripheral surface side, at least opposed to the stator core in the rotational axis direction, include a magnetizing component flowing toward the center part of the rotor magnet in the rotational axis direction. Because of this, effective magnetization (magnetization rate is greater than or equal to 80%) is performed for both ends of the rotor magnet. Therefore, it is possible to effectively use the energy product of the rotor magnet and reduce the amount of leakage magnetic flux that flows through the magnetic attraction plate from a portion of the end portion of the rotor magnet, which is not opposed to the stator core on the base side. As a result, it is possible to reduce attraction by a low-profile motor even when a gap between the rotor magnet and the magnetic attraction plate is reduced. Therefore, loss torque in a direction in which the rotor part is prevented from rotating is reduced, and thus it is possible to reduce electric current consumption.

A rotor magnet manufacturing jig of a tenth invention is a manufacturing jig for the above described rotor magnet, and includes a magnetizing yoke and an outer yoke portion. The magnetizing yoke is disposed to make contact with the inner peripheral surface or the outer peripheral surface of the rotor magnet on a side opposed to the stator core. The magnetizing yoke has a dimension greater than axial length of the rotor magnet, and has a magnetizing coil wound therearound. The outer yoke portion is disposed to make contact with the inner peripheral surface or the outer peripheral surface of the rotor magnet on a side opposed to the stator core. The outer yoke portion has length greater than axial length of the rotor magnet.

Because of this, it is possible to perform magnetization with a method of manufacturing a rotor magnet of a simple configuration, and thus it is possible to reduce the time for performing a magnetization process.

According to the rotor magnet of the present invention, it is possible to easily adjust attraction in a predetermined direction, which is generated by the rotor magnet that is configured to be mounted in a spindle motor, without disposing a separate member such as a ring member.

BRIEF DESCRIPTION OF THE DRAWINGS

Referring now to the attached drawings which form a part of this original disclosure:

FIG. 2A is a schematic diagram illustrating a state of magnetic poles of the rotor magnet of the present invention;

FIG. 2B is a schematic diagram illustrating a state of magnetic flux of the rotor magnet of the present invention;

FIG. 5A is an enlarged diagram illustrating directions of magnetic flux inside and outside the rotor magnet illustrated in FIG. 4;

FIG. 5B is an enlarged diagram illustrating directions of magnetic flux inside and outside a rotor magnet taken as a comparative example;

DETAILED DESCRIPTION OF THE INVENTION

First Embodiment

A hard disk drive (HDD; recording and reproducing apparatus) 40 will be hereinafter explained with reference to FIGS. 3-9. Here, a spindle motor 20 including a rotor magnet 7 of an embodiment of the present invention is mounted in the HDD 40.

Entire Configuration of HDD 40

Figure 1B:
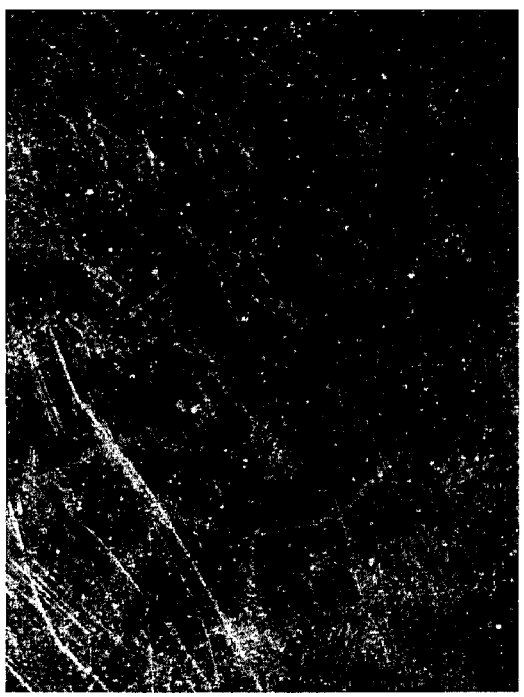
FIG. 1B is a photograph of a top view of a rotor magnet observed with a magnet viewer put on the rotor magnet.
Figure 1A:
FIG. 1A is a photograph showing a state of a magnetized rotor magnet.
Figure 3:
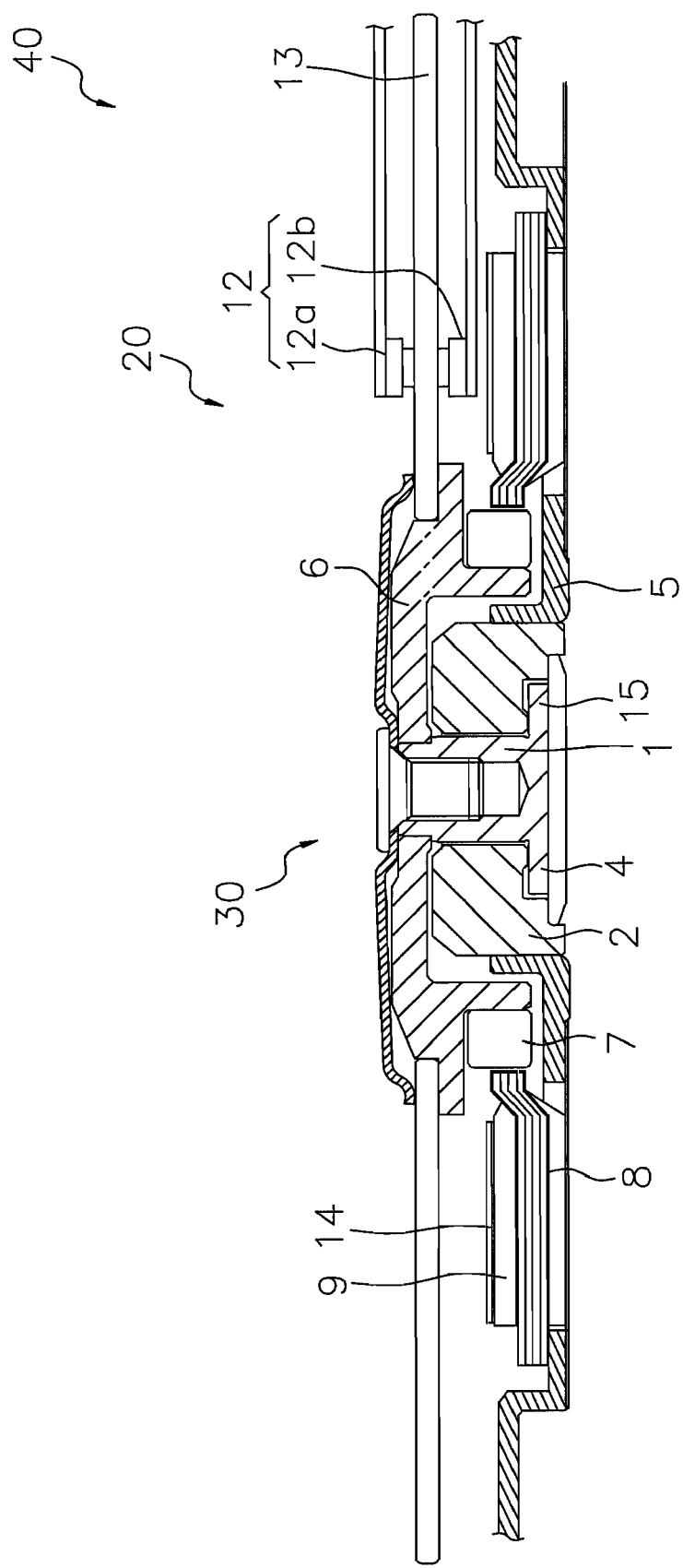
FIG. 3 is a cross-sectional view illustrating an overall configuration of a IDD in which a spindle motor including a rotor magnet of an embodiment of the present invention is mounted.

As illustrated in FIG. 3, a head unit 12 including a plurality of recording/reproducing heads 12a and 12b, and the spindle motor 20 are mounted in the interior of the HDD 40 of the present embodiment. Here, the recording-reproducing heads 12a and 12b, which are included in the head unit 12, record information in a disk (recording medium) 13 or reproduces the already-recorded information out of the disk 13, respectively.

Two read-write heads 12a and 12b are included in the head unit 12, and are disposed adjacent to the top and bottom sides of the disk 13.

The disk 13 is a disk-shaped recording medium configured to be attached to the HDD 40, and has diameter of 0.85, 1.0, 1.8, 2.5 inches or the like.

Figure 4:
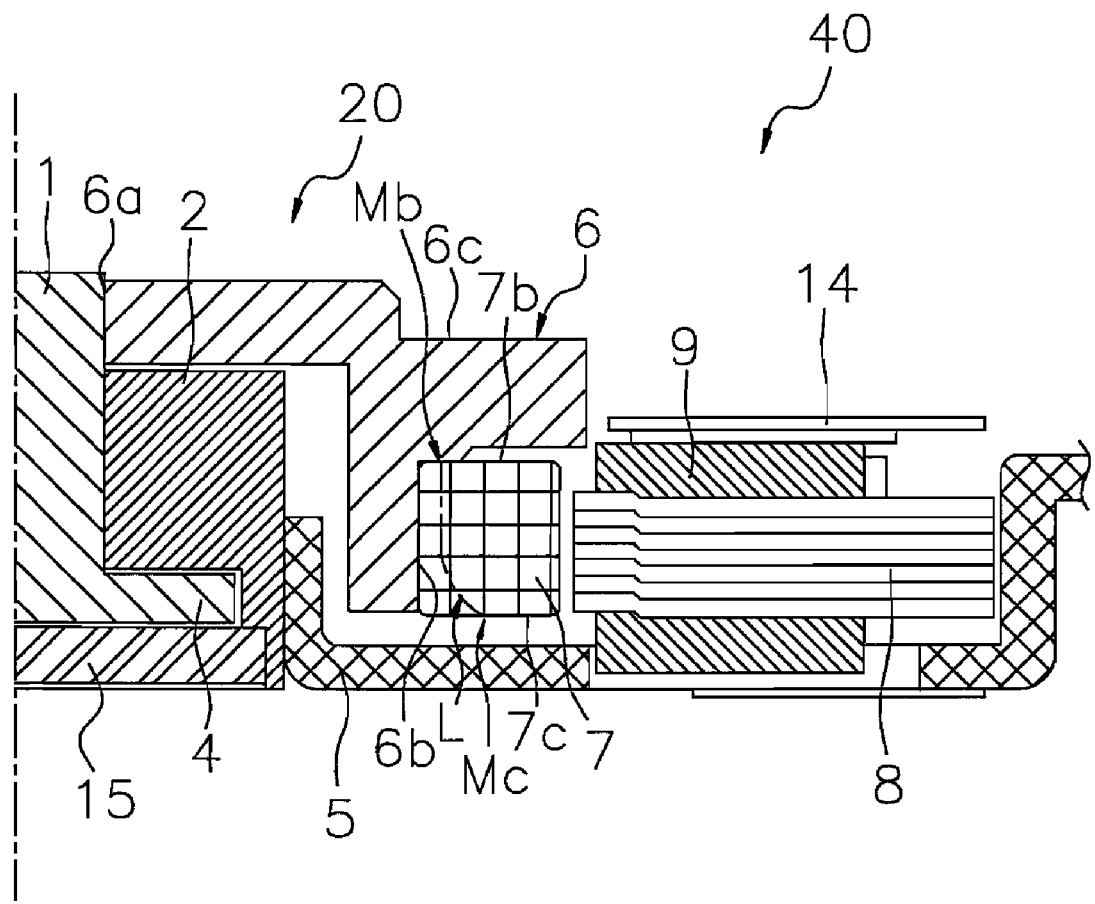
FIG. 4 is an enlarged schematic diagram illustrating a configuration of a rotor magnet disposed in the HDD illustrated in FIG. 1 and the periphery thereof.

The spindle motor 20 is a device that is configured to function as a rotational-driving source for rotationally driving the disk 13. As illustrated in FIGS. 3-4, the spindle motor 20 includes the rotor magnet 7, a stator core 8, a stator coil 9, a magnetic shield plate 14, a bearing unit (hydrodynamic bearing device) 30, and the like.

Explanation of Members Forming Spindle Motor 20

Figure 6A:
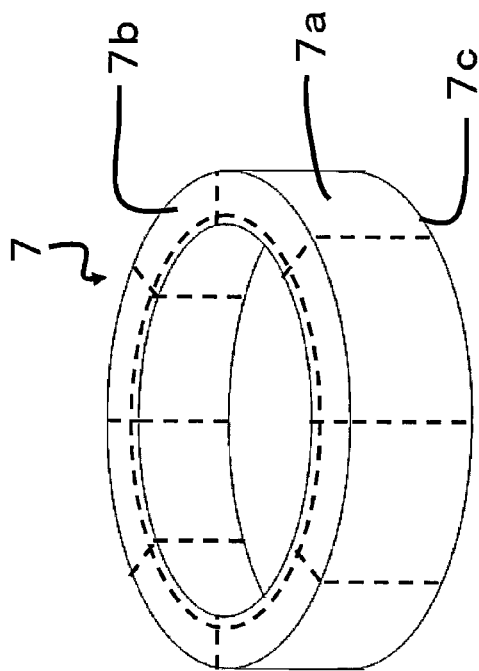
FIG. 6A is a perspective view illustrating a magnetizing boundary line of the rotor magnet of the present invention.
Figure 6C:
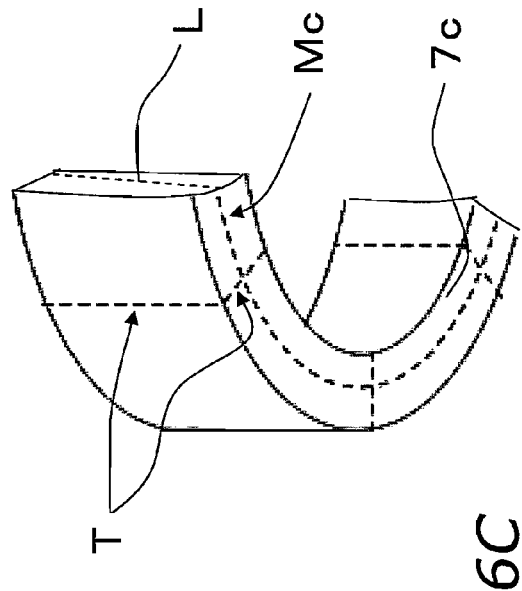
FIG. 6C is a bottom perspective view illustrating a magnetizing boundary of the rotor magnet of the present invention.
Figure 6B:
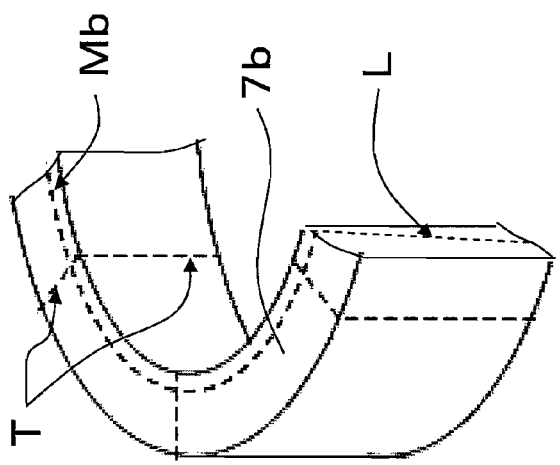
FIG. 6B is a top perspective view illustrating a magnetizing boundary line of the rotor magnet of the present invention.

The rotor magnet 7 is an annular member having outer diameter of 9-11 mm, inner diameter of 6-8 mm, and height of 1-2 mm, and a plurality of magnetic poles (e.g., 12 magnetic poles) are disposed in a condition that a north magnetic pole and a south magnetic pole are alternately disposed adjacent to each other (see FIGS. 6A-6C). Note that eight magnetic poles are illustrated in the rotor magnet of the figures for easy-visualization. For example, the rotor magnet 7 is made of an Nd—Fe—B system resin magnet with the maximum energy product of 12 MGOe or the like, and is attached to a magnet retaining portion 6b of a rotor hub 6 to be described (see FIG. 4 or the like). In addition, magnetization properties of the top and bottom surfaces of the rotor magnet 7 in an axial direction (i.e., rotational axis direction) are different from each other. In other words, the rotor magnet 7 is magnetized so that magnetic polar boundary lines Mb and Mc, which circumferentially extend in the rotor magnet 7, are located at different positions on the top and bottom surfaces of the rotor magnet 7. Note that a state of magnetized rotor magnet 7 and a process of magnetizing the rotor magnet 7 will be hereinafter explained in detail.

The stator core 8 includes a plurality of protruding poles that are disposed along a radial direction of the stator core 8 at intervals of approximately the same angle. The stator coil 9 is wound around the protruding poles, respectively. The stator core 8 applies rotational force to the rotor magnet 7 by applying magnetic flux to be generated when electrical current is applied to the stator coil 9. Here, the rotor magnet 7 is disposed in an inner side of the stator core 8 in the radial direction, and is opposed to the stator core 8.

The magnetic shield plate 14 is a magnetic stainless steel member with thickness of approximately 0.1 mm, which is configured to be used for preventing magnetic leakage to the outside. The magnetic shield plate 14 is attached to and covers the upper portion of the stator core 8.

The bearing unit 30 is a hydrodynamic bearing device included in the spindle motor 20, and is disposed in the vicinity of the center part of the spindle motor 20.

Explanation of Members Forming Bearing Unit 30

The bearing unit 30 is configured to include a shaft (rotational axis) 1, a sleeve 2, a thrust flange 4, a base 5, and a rotor hub 6.

The shaft 1 is a member functioning as a rotational axis of the bearing unit 30, and is made of stainless steel.

The sleeve 2 is embedded in the bearing unit 30 in a condition that the sleeve 2 is capable of rotating relative to the shaft 1 and the thrust flange 4. In addition, a thrust hydrodynamic groove (not illustrated in the figure) for generating hydrodynamic pressure is formed on the surface of the thrust flange 4, which is opposed to the thrust plate 15 in the axial direction. Furthermore, a thrust hydrodynamic portion is formed between the thrust flange 4 and the thrust plate 15. Similarly, a radial hydrodynamic groove (not illustrated in the figure) for generating hydrodynamic pressure is formed between the opposed surfaces of the shaft 1 and the sleeve 2 in the radius direction. Furthermore, a radial hydrodynamic portion is formed between the shaft 1 and the sleeve 2. The sleeve 2 is made of copper alloy such as brass, and an electroless nickel plating process is performed for the surface of the sleeve 2.

The thrust flange 4 is made of stainless steel, and may be integrally formed with the shaft 1 or may be fixed to the shaft 1 by press fitting or adhesion.

The base 5 is made of a magnetic stainless steel member or a magnetic stainless steel plate, and an electroless nickel plating process is performed for the base 5. The base 5 forms a part of the stationary side of the spindle motor 20. (Note that the base 5 may be made of aluminum ally that is non-magnetic material, and a magnetic plate for attracting the rotor magnet may be attached thereon when the disk size is large.) In addition, the base 5 forms a closed chassis of the HDD 40. The bearing unit 30 is fixed to the vicinity of the center part of the base 5.

The rotor hub 6 is made of stainless steel that is magnetic material, and is engaged with and fixed to the upper end potion of the shaft 1 to rotate integrally with the shaft 1. As illustrated in FIG. 4, the rotor hub 6 includes a center hole 6a into which the upper end portion of the shaft 1 is inserted, a magnet retaining portion 6b to which the rotor magnet 7 is attached, and a disk mounting surface 6c in which the disk 13 is mounted.

State of Magnetized Rotor Magnet 7

According to the present embodiment, as illustrated in FIG. 6, the approximately annular shaped rotor magnet 7 is magnetized so that a radial position of the magnetic polar boundary line Mb, which circumferentially extends in the rotor magnet 7, on the top surface 7b of the rotor magnet 7, and a radial position of the magnetic polar boundary line Mc, which circumferentially extends in the rotor magnet 7, on the bottom surface 7b of the rotor magnet 7, are different from each other (Note that alternating magnetic polar boundary line T is observable as the other magnetic polar boundary line).

Specifically, as illustrated in FIG. 5A, the rotor magnet 7 is magnetized so that the magnetic fluxes are generated in different directions on the top and bottom surfaces 7b and 7c sides of the main body 7a of the rotor magnet 7. More specifically, a position of magnetic polar boundary line on the base-side end surface of the rotor magnet 7 is moved to the outer peripheral side compared to the conventional case (Note that this is a case that the stator core is disposed on the outer peripheral side).

The conventional rotor magnet is generally magnetized in a condition that a magnetizing yoke is disposed in the vicinity of the inner peripheral side or the outer peripheral side of the rotor magnet, and a magnetizing core pin (yoke member) or the like, which functions as a magnetic flux convergence member, is disposed in the vicinity of the rest of the inner and outer peripheral sides, which is opposed to the peripheral side to which the magnetizing yoke is disposed. Accordingly, as illustrated in a comparative example of FIG. 5B, the magnetic flux is formed in the rotor magnet, and it uniformly flows in the radial direction. As a result, attractions on the axially top and bottom surfaces are generated in approximately the same level, and the magnetic polar boundary line Mb, which circumferentially extends on the top surface of the rotor magnet, and the magnetic polar boundary line Mc, which circumferentially extends on the bottom surface of the rotor magnet, are located on the inner circumferential side of the rotor magnet. In other words, they are located on approximately the same position in the radius direction (In this case, the rotor magnet is magnetized with the magnetizing yoke that includes the magnetizing coil on the outer periphery thereof. Accordingly, magnetized level on the outer peripheral side is greater than that on the inner peripheral side. Here, radial distance delta-Rs ($\Delta Rs$) from the inner periphery of the rotor magnet to the circumferentially extending magnetic polar boundary lines Mb and Mc, and radial distance delta-Rn ($\Delta Rn$) from the outer periphery of the rotor magnet to the circumferentially extending magnetic polar boundary lines Mb and Mc, follow the relation "$\Delta Rn > \Delta Rs$").

On the other hand, the rotor magnet 7 of the present embodiment is magnetized by a manufacturing jig 50 (see FIG. 7A) to be described. As illustrated in FIG. 7B, when the rotor magnet 7 is magnetized, the magnetic flux flows downward because a step portion of the yoke member 51 is made of magnetic material. Accordingly, as illustrated in FIG. 5A, the magnet is magnetized such that the magnetic polar boundary line Mc, which circumferentially extends on the bottom surface 7c side, is formed in a radially-outward position. In addition, the magnetic polar boundary line Mb, which circumferentially extends on the top surface of the rotor magnet, is formed to be located on a slightly inner peripheral side in the radius direction. Specifically, as illustrated in FIGS. 8A and 8B with photographs observed with a magnet viewer, in a case of a magnet with height of 1.28 mm, outer diameter of 9.85, and inner diameter of 6.75 mm, the magnetic polar boundary line, which circumferentially extends on the top surface of the rotor magnet, is formed to have radius of 3.85 mm (diameter of 7.7 mm), and the magnetic polar boundary line, which circumferentially extends on the bottom surface of the rotor magnet, is formed to have radius of 4.15 mm (diameter of 8.3 mm).

Figure 9:
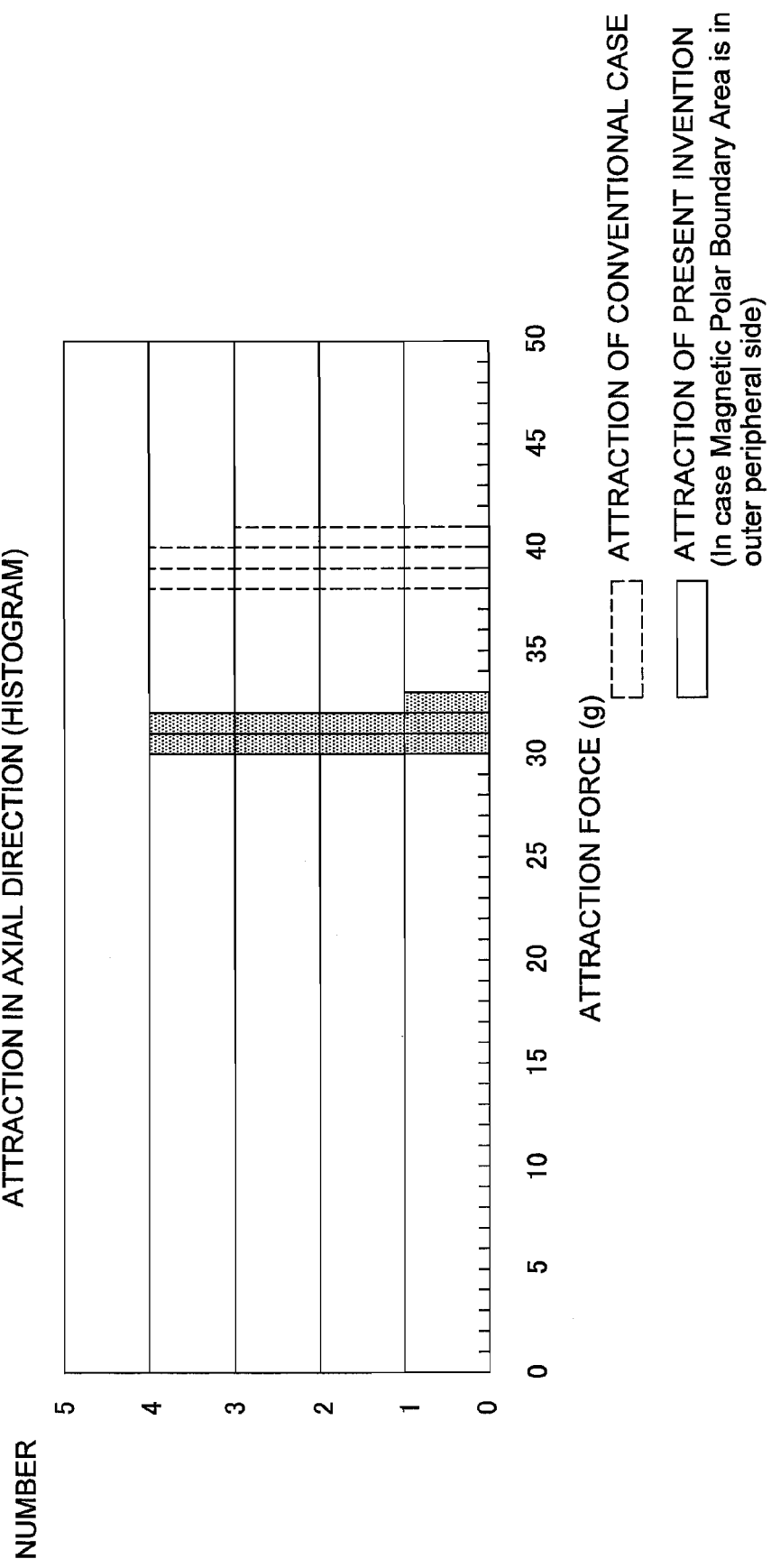
FIG. 9 is a graph illustrating variation of axial attraction of the rotor magnet illustrated in FIG. 4A.

With the configuration, it is possible to generate different-level axial attractions on the top and bottom surfaces 7b and 7c of the rotor magnet 7 mounted in the spindle motor 20. Specifically, as illustrated in FIG. 5A, the amount of magnetic flux is reduced, which leaks downward from the bottom surface 7c separately disposed from the base with a gap of 0.2 mm. Accordingly, as illustrated in FIG. 9, the axially-downward attraction force of 31-33 g was successfully generated. In other words, the axially-downward attraction was successfully reduced, compared to a comparative example (illustrated with dotted lines: 39-41 g). As a result, abrasion to be generated in the thrust bearing unit during startup will be reduced. Accordingly, load on the bearing unit 30 will be reduced, and it is possible to configure a long-life spindle motor 20. Furthermore, it is possible to reduce rotational resistance by reducing the axially downward attraction of the rotor magnet 7, and thus it is possible to achieve low power consumption.

Magnetizing Process of Rotor Magnet 7

According to the present embodiment, radial positions of the magnetic polar boundary lines Mb and Mc circumferentially extending on the top and bottom surfaces 7b and 7c of the rotor magnet are changed by changing the axial direction of the above described magnetic polar boundary line L. As a result, the manufacturing jig 50 illustrated in FIGS. 7A and 7B to be described is used for manufacturing the rotor magnet 7 that is capable of adjusting axial attraction.

Specifically, the manufacturing jig 50 includes the magnetizing core pin (yoke member) 51, a presser member (second support portion) 52, insulating molds 53a and 53b, a magnetizing yoke (magnetizing yoke part) 54, and a coil 55.

Figure 7A:
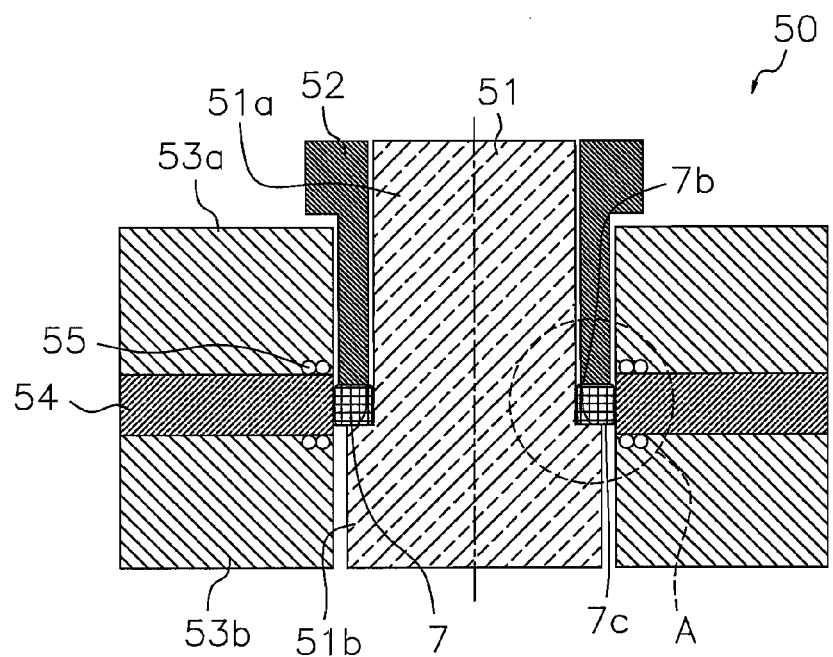
FIG. 7A is a cross-sectional view illustrating a manufacturing jig of the rotor magnet of the present invention.
Figure 7B:
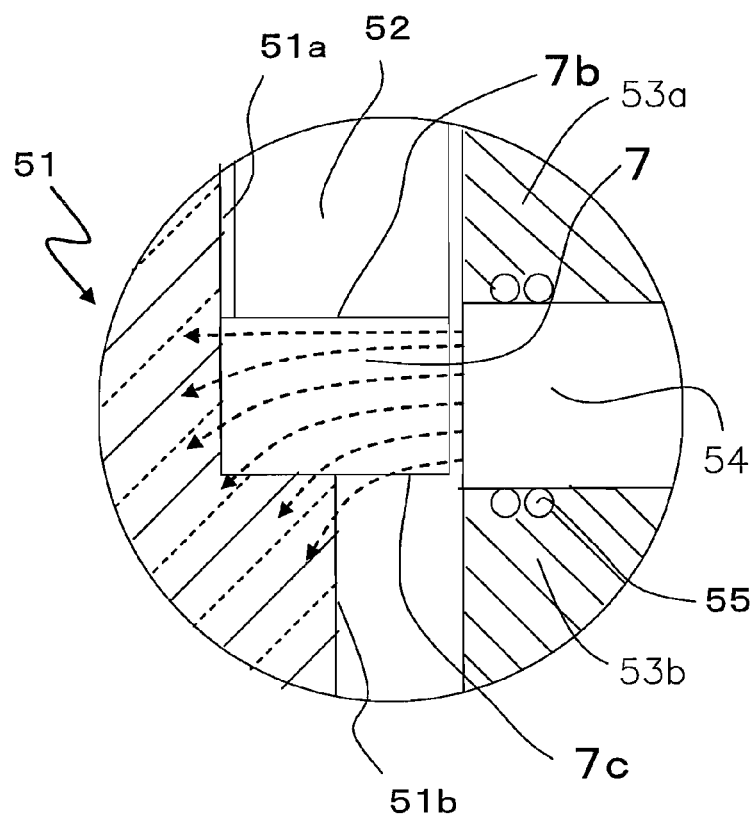
FIG. 7B is an enlarged schematic diagram illustrating a state of magnetic flux of the magnetized rotor magnet of the present invention.
Figure 8B:
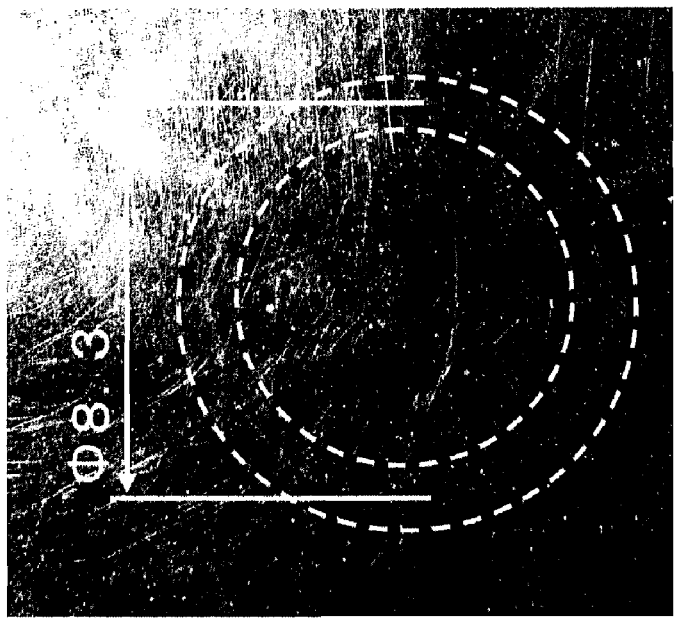
FIG. 8B is a photograph of a bottom view of the rotor magnet illustrated in FIG. 6A, which is observed with a magnet viewer put on the bottom of the rotor magnet.
Figure 8A:
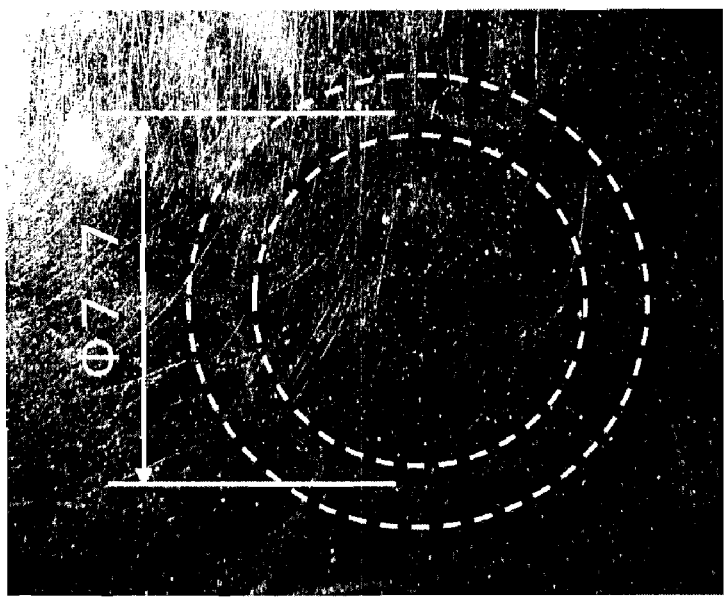
FIG. 8A is a photograph of a top view of the rotor magnet illustrated in FIG. 6A, which is observed with a magnet viewer put on the top of the rotor magnet.

The magnetizing core pin 51 is an approximately columnar member, and includes a small-diameter portion 51a and a large-diameter portion (first support portion) 51b as illustrated in FIGS. 7A and 7B. In addition, when the magnetizing core pin 51 is inserted into the inner diameter side of the rotor magnet 7, the small-diameter portion 51a makes contact with the surface of the rotor magnet 7 on the inner diameter side, and the bottom surface 7c of the rotor magnet 7 is supported by a step formed in a border area between the small-diameter portion 51a and the large-diameter portion 51b.

The presser member 52 is an annular member that is made of non-magnetic material such as resin. As illustrated in FIGS. 7A and 7B, the presser member 52 makes contact with the surface (top surface 7b) opposite to the surface supported by the step of the magnetizing core pin 51 in the rotor magnet 7.

The insulating molds 53a and 53b are approximately annular members that are made of resin. As illustrated in FIG. 7A, the insulating molds 53a and 53b are integrally formed above and below the magnetizing yoke 54 that is disposed to be opposed to the outer surface of the rotor magnet 7 in the radial direction so that the coil is kept on an insulating state and is prevented from moving by electromagnetic force generated in magnetization.

The magnetizing yoke 54 is made of magnetic material, and is disposed in the vicinity of the outer surface of the rotor magnet 7 in the radial direction. In addition, a coil 55, which is configured to apply magnetic flux necessary to magnetize the rotor magnet 7, is wound around the magnetizing yoke 54.

Figure 10:
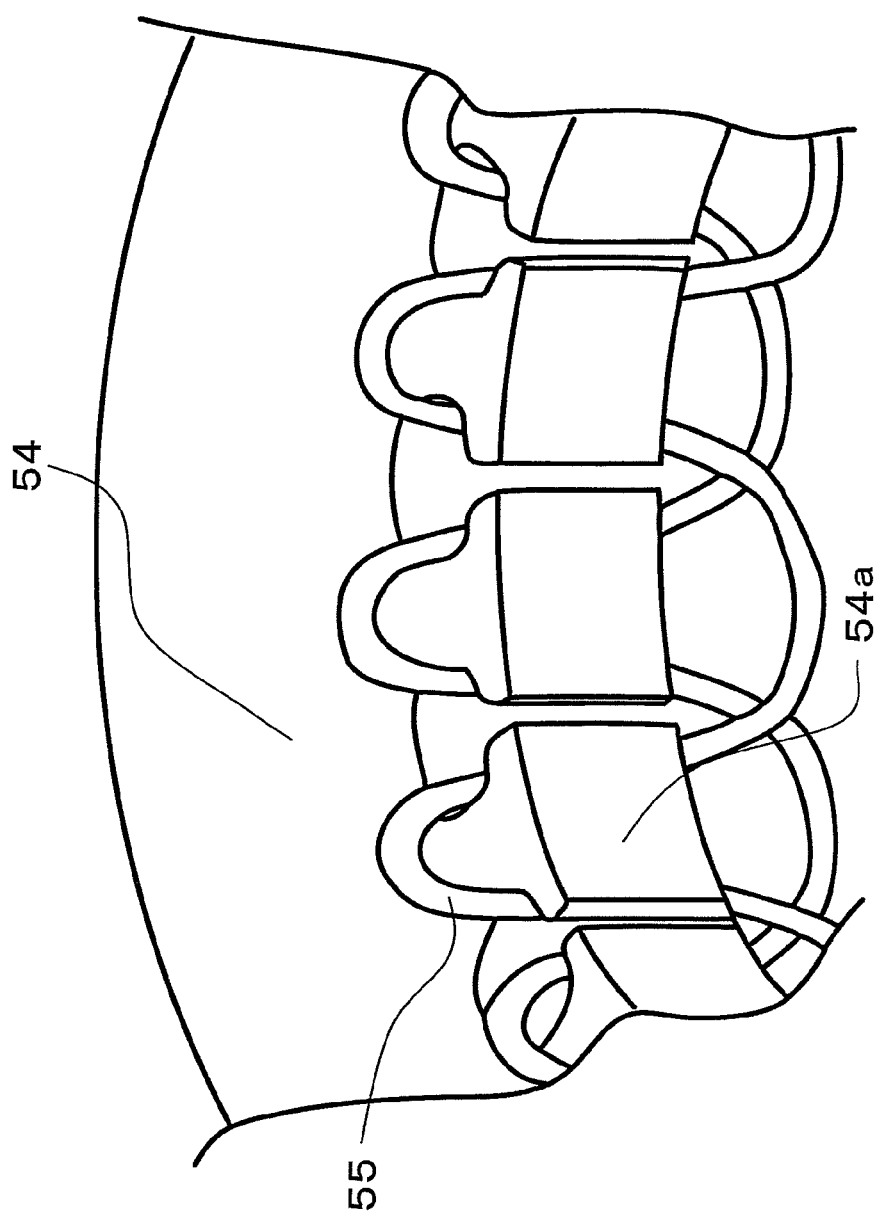
FIG. 10 is a schematic diagram illustrating a configuration of a coil wound around the magnetizing yoke illustrated in FIG. 7A.

The coil 55 is a copper wire through which electric current for generating magnetic flux applied to the rotor magnet 7 flows. As illustrated in FIG. 10, slits are axially formed on the circumferential surface 54a of the magnetizing yoke 54. Here, the number of the slits is the same as that of the magnetizing poles. In addition, the coil 55 is wound around the end portion side of the magnetizing yoke 54 on the rotor magnet 7 side such that the coil 55 is wound around every other protruding pole by a turn in a zigzag manner. Needless to say, the coil 55 may be wound around the protruding pole by a plurality of turns, depending on allowable current value and/or a magnetizing condition of a magnetizing power supply and/or a magnetizing device (manufacturing jig).

As described above, according to the present embodiment, the bottom surface 7c side of the rotor magnet 7 is supported by the magnetizing core pin 51 that is made of magnetic material, and the top surface 7b side of the rotor magnet 7 is supported by the presser member 52 that is made of non-magnetic material.

With the configuration, it is possible to magnetize the rotor magnet 7 so that the magnetic flux on the bottom surface 7c side obliquely flows by the magnetic flux to be generated by electric current flowing through the coil 55 that is wound around the end portion of the magnetizing yoke 54.

In other words, the magnetic flux, which is generated when electric current flows through the coil 55, flows toward the magnetic material side, not toward the non-magnetic material side. According to the present embodiment, the bottom surface 7c side of the rotor magnet 7 is supported by the magnetizing core pin 51 that is made of magnetic material. Therefore, the magnetic flux generated by the electric current flowing through the coil 55 does not uniformly flow inward in the radial direction, but is guided obliquely downward on the bottom surface 7c side. Accordingly, it is possible to create a condition that magnetization properties of the top and bottom surfaces 7b and 7c of the rotor magnet 7 are different from each other. In other words, it is possible to magnetize the rotor magnet 7 while a direction of the magnetic flux on the bottom surface 7c side is changed.

As a result, it is possible to achieve the rotor magnet 7 with axially varying attraction when the rotor magnet 7 is attached to the spindle motor 2 by creating a condition that magnetizing property axially varies. Therefore, it is possible to provide a variety of spindle motors, such as a long-lived spindle motor 20 by reducing abrasion to be generated in the thrust bearing unit, and a spindle motor that is allowed to be mounted in machines such as a mobile machine that an impact-resistance property is enhanced by enhancing axial stiffness, only by adjusting the shape of the magnetizing yoke and/or changing the mounting direction thereof depending on purposes.

Features of Rotor magnet 7 and Spindle Motor 20 of Present Embodiment Feature 1

As illustrated in FIG. 3, the rotor magnet 7 of the present embodiment is an approximately annular member attached to the rotor hub 6 that is configured to rotate around the shaft 1 forming a part of the spindle motor 20. As illustrated in FIGS. 4 and 5A, the rotor magnet 7 is magnetized so that the magnetic polar boundary line Mc which circumferentially extends on the top surface 7b, and the magnetic polar boundary line Mb, which circumferentially extends on the bottom surface 7c, are located at radially different positions.

Accordingly, when the rotor magnet 7 is mounted in the spindle motor 20, the magnetizing properties on the axially top and bottom surfaces 7b and 7c are different from each other. Therefore, it is possible to easily adjust axial attraction of the rotor magnet 7 to be a desired level, for instance, by changing the mounting direction thereof. As a result, it is possible to apply it to the spindle motor with a variety of purposes without adding a member (e.g., a ring member) for adjusting attraction and without changing the simple configuration thereof.

Feature 2

As illustrated in FIGS. 4 and 5A, the rotor magnet 7 is attached to the spindle motor 20 of the present embodiment, and the rotor magnet 7 is configured such that a direction of the magnetic flux on the bottom surface 7c side is changed for reducing the axially-downward attraction.

With the configuration, axially-downward attraction is reduced, and abrasion generated between members in the thrust bearing unit is reduced during the start-up or the like. Accordingly, it is possible to apply it to, for instance, a spindle motor used for a server motor for which not an impact-resistant property but a long-lived property is demanded. Furthermore, it is possible to reduce electric current loss by reducing attraction. Accordingly, it is possible to achieve a spindle motor with low power consumption.

Feature 3

As illustrated in FIG. 3, the above described spindle motor 20 is mounted in the HDD 40 of the present embodiment.

With the configuration, it is possible to achieve the same effect as the above described effects. That is, it is possible to apply it to spindle motor with a variety of purposes by regulating axial attraction, the amount of leakage magnetic flux, or the like, without adding a member (e.g., a ring member) for adjusting attraction and without changing the simple configuration thereof.

Feature 4

As illustrated in FIGS. 7A and 7B, the manufacturing jig 50 for the rotor magnet 7 of the present embodiment includes the magnetizing yoke 54, which is adjacently disposed outside the rotor magnet 7 in the radial direction and applies magnetic flux for magnetizing the rotor magnet 7, the presser member 52 for supporting one of the axial surfaces of the rotor magnet 7 (i.e., top surface 7b), and the large-diameter portion 51b (i.e., a portion forming a step with the small-diameter portion 51a) of the magnetizing core pin 51 for supporting the other of the axial surfaces of the rotor magnet 7 (i.e., bottom surface 7c).

With the configuration, the other of the axial surfaces of the rotor magnet 7 (i.e., bottom surface 7c) is supported by the large-diameter portion 51b of the magnetizing core pin 51, and thus it is possible to highly-obliquely set the direction of the magnetic flux to be generated by the electric current flowing through the coil 55 that is wound around the magnetizing yoke 54 on the bottom surface 7c side of the rotor magnet 7. Accordingly, it is possible to non-uniformly set the axial magnetization property of the rotor magnet 7. As a result, it is possible to reduce the axially-downward attraction, and it is also possible to easily manufacture the rotor magnet that is configured to be mounted in the spindle motor with a variety of purposes.

Feature 5

As illustrated in FIGS. 7A and 7B, according to the manufacturing jig 50 for the rotor magnet 7 of the present embodiment, the step formed between the small-diameter portion 51a and the large-diameter portion 51b of the magnetizing core pin 51, which is inserted in the inner peripheral side of the rotor magnet 7, is used as a support member for supporting the bottom surface 7c of the rotor magnet 7.

With the configuration, the step portion is formed, for instance, by processing the magnetizing core pin 51 that is originally made of magnetic material, and one of the axial surfaces of the rotor magnet 7 (i.e., bottom surface 7c) is supported by the step portion. Accordingly, it is possible to easily manufacture the rotor magnet 7 in which a desired magnetization property is given to a predetermined axial position without increasing the number of members.

Second Embodiment

A second embodiment of the present invention is explained with reference to FIGS. 19-26, FIG. 29 and FIGS. 41, 42.

In the first embodiment of the present invention, a case that the magnetized state of the rotor magnet 7 in the radial direction is uniform and approximately perpendicular to the axial direction is described as a conventional art. In addition, a problem is solved by adjusting attraction and leakage magnetic flux based on a position of the magnetic polar boundary line on the end portion. However, there is a case that a problem is solved by simultaneously moving absolute positions of the magnetic polar boundary lines on the both end surfaces without changing relative positions thereof. Therefore, the case is explained with reference to FIGS. 19-29.

Figure 19:
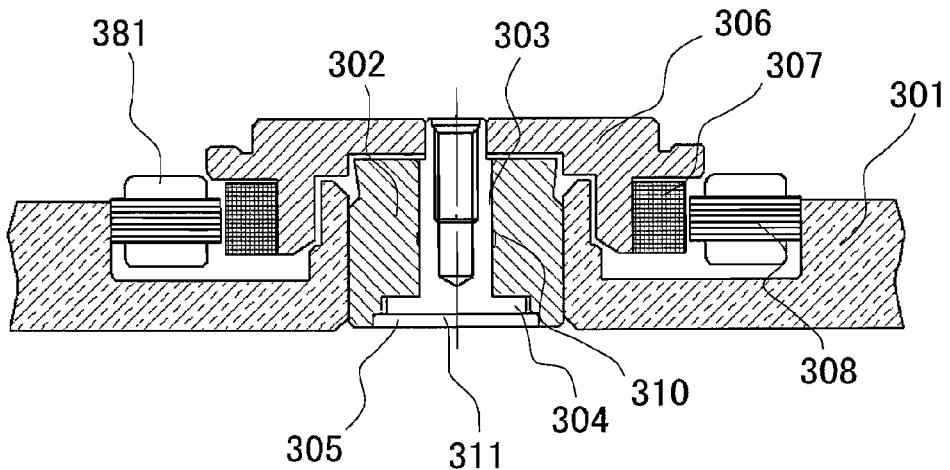
FIG. 19 is a cross-sectional view of an inner rotor type spindle motor of a second embodiment of the present invention.
Figure 20:
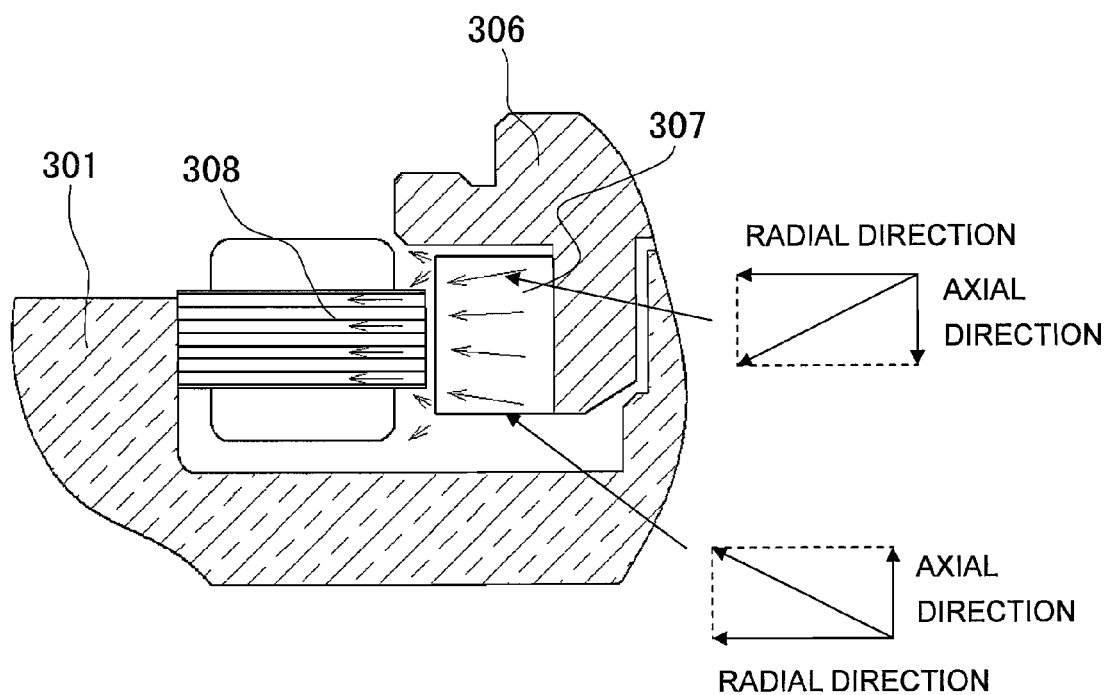
FIG. 20 is a detailed cross-sectional view of a rotor magnet section of the spindle motor of the second embodiment of the present invention.
Figure 21:
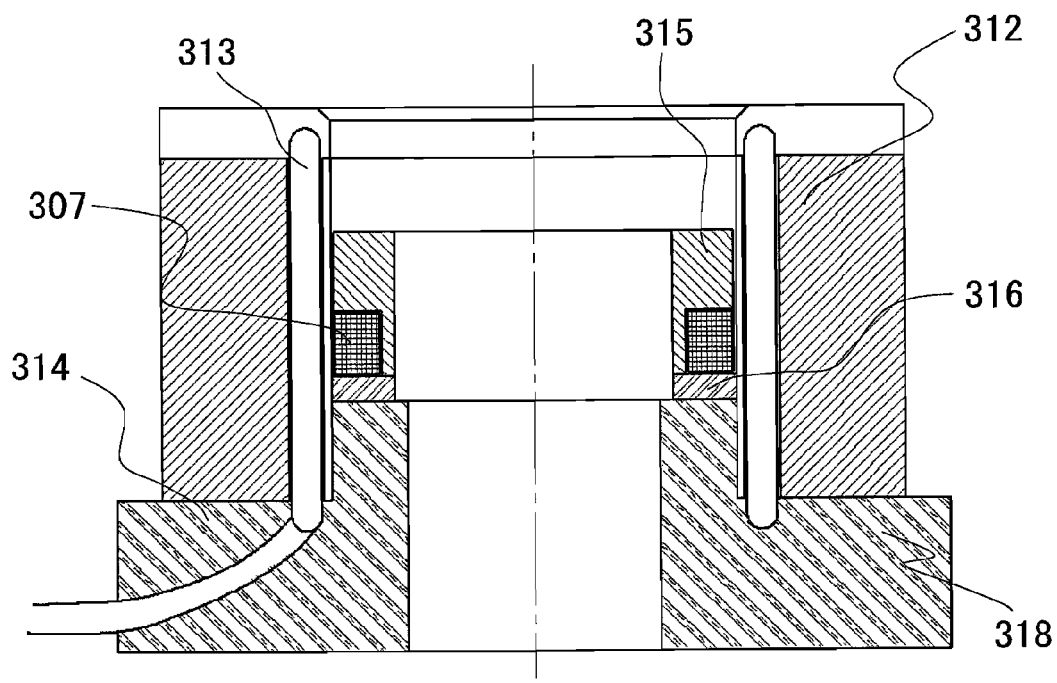
FIG. 21 is a cross-sectional view of a rotor magnet manufacturing jig of the second embodiment of the present invention.
Figure 22:
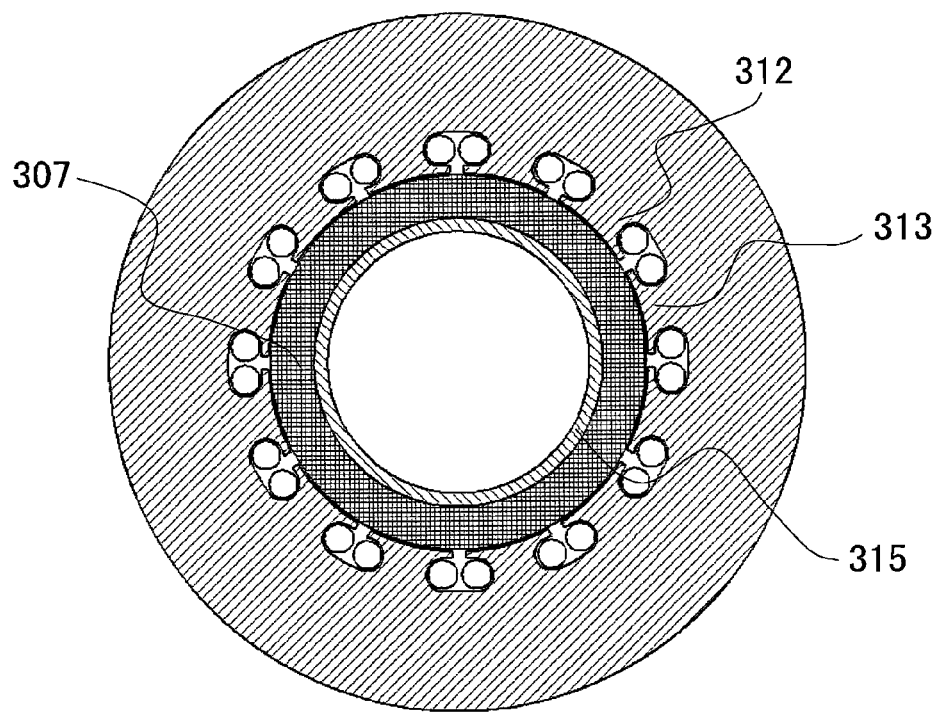
FIG. 22 is a cross-sectional view of the rotor magnet manufacturing jig of the second embodiment of the present invention in a direction perpendicular to the rotational axis.

FIGS. 19 and 20 are cross-sectional views of an inner rotor type spindle motor of the present embodiment. FIGS. 21-29 illustrate a method of manufacturing a rotor magnet and a magnetizing system of the invention.

In the present embodiment, a motor including a hydrodynamic bearing device is employed as a bearing rotation type HDD spindle motor illustrated in FIG. 19. In addition, the entire motor includes a base 301 that is made of magnetic material and functions as a fixed member, and a rotor part 306 that is attached to the base 301 from above and functions as a rotation member. In the motor, a hollow-cylindrical shaped bearing sleeve 302 is formed in an approximately center part of the base 301, and functions as a fixed bearing member. The bearing sleeve 302 is joined to the base 301 by press-fitting, thermal fitting, or adhesion.

In addition, a stator core 308, which is formed by lamination of electromagnetic steel plates, is fitly attached to the outside of the bearing sleeve 302 of the base 301. In addition, a coil winding 381 is wound around each of a plurality of protruding poles that are provided for the stator core 308 and radially protrude in radially-inward direction.

Furthermore, a rotational axis 303, which forms a part of the above described rotor part 306, is rotatably inserted into a center hole that is formed in the bearing sleeve 302. In other words, the hydrodynamic surface, which is formed on the inner peripheral wall of the bearing sleeve 302, is disposed to be radially opposed to the hydrodynamic surface, which is formed on the outer peripheral wall of the rotational axis 303. Thus, a radial hydrodynamic bearing unit 310 is formed by the hydrodynamic surfaces. More specifically, the hydrodynamic surface formed on the bearing sleeve 302 side and the hydrodynamic surface formed on the rotational axis 303 side, both of which form the radial hydrodynamic bearing unit 310, are disposed to be opposed to each other in a circumferential shape through a minute gap of 2-4 micrometers (μm). Also, lubricating fluid such as lubricating oil, ionic liquid, magnetic fluid, and air is injected or interposed in the bearing space formed by the minute gap so as to be continued in the axial line direction.

Furthermore, a radial hydrodynamic groove, which is formed in a herring bone shape, a spiral shape, or the like, is formed on at least one of the hydrodynamic surfaces of the bearing sleeve 302 and the rotational axis 303. The radial hydrodynamic groove is divided into two blocks in the axial line direction, and is annularly disposed to be recessed. During rotation, the lubricating fluid (not illustrated in the figure) is pressurized by a pumping effect of the radial hydrodynamic groove, and thus hydrodynamic pressure is generated. At this time, both the above described rotational axis 303 and the rotor part 306 are supported by means of the hydrodynamic pressure of the lubricating fluid with respect to the bearing sleeve 302 in the radial direction in a non-contact state.

Furthermore, the rotor part 306 is an approximately cup-shaped member that is made of stainless steel. The hole formed in the center part of the rotor part 306 is integrally joined to the upper end portion of the rotational axis 303 by press-fitting, thermal fitting, or adhesion. A recording medium disk such as a magnetic disk (not illustrated in the figure) is configured to be fixed to the rotor part 306 by pressing force applied from the upside of a damper (not illustrated in the figure).

In addition, an annular rotor magnet 307 is attached to the outer peripheral wall side of the rotor part 306. The rotor magnet 307 is disposed to be adjacently and annularly opposed to the inner peripheral end surface of each of the protruding poles in the above described stator core 308.

Furthermore, the bottom surface of the rotor magnet 307 and the stationary base 301 made of magnetic material are disposed to be axially opposed to each other through a constant gap.

On the other hand, a disk-shaped thrust plate 304 is firmly fixed to the lower end portion of the above described rotational axis 303 by means of thermal fitting, press-fitting, or welding. The thrust plate 304 is disposed above a counter plate 305 through a thrust gap of 10-30 μm, and is also disposed below the bottom side of the above described bearing sleeve 302 through a gap of 10-30 μm. A thrust hydrodynamic bearing unit 311 is formed on at least one of the lower surface of the bearing sleeve 302 and the top surface of the thrust plate 304, and at least one of the bottom surface of the thrust plate 304 and the top surface of the counter plate 305. Here, the thrust hydrodynamic bearing unit 311 includes a thrust hydrodynamic groove that is formed in a herring bone shape or a spiral shape (not illustrated in the figure).

Lubricating fluid such as oil, ionic liquid, magnetic fluid, and air is filled in the thrust gap. During rotation, the lubricating fluid is pressurized by a pumping effect of the thrust hydrodynamic groove that is formed on the above described thrust plate 304, and thus hydrodynamic pressure is generated. Then, the above described rotational axis 303 and the rotor part 306 are supported by means of the hydrodynamic pressure of the lubricating fluid in a non-contact state that they are levitated in the thrust direction.

Furthermore, the leakage magnetic flux from the rotor magnet 307 works as the magnetic attraction on a portion of the base 301, which is located to be opposed to the bottom surface of the rotor magnet 307. Therefore, regulation of a thrust position of an entire rotational body including the rotor part 306, the rotational axis 303 and the like is well-maintained regardless of a posture of the rotational body.

Here, for example, in a spindle motor including a rotor magnet and a rotor magnet manufacturing jig, which are illustrated in FIGS. 30-33 as a comparative example, a magnetizing coil 513 is wound around each of a plurality of protruding poles, which are disposed to radially protrude in a radially-inward direction, of a magnetizing yoke 512 to be used for a rotor magnet manufacturing jig. In addition, a rotor magnet 507 is disposed such that the outer periphery thereof makes contact with the inner periphery of the magnetizing yoke 512. In the configuration, the stator core is disposed on the outer peripheral side of the rotor magnet. In addition, the magnetizing coil is wound around a yoke that is disposed on the outer peripheral side of the rotor magnet, and thus the magnetizing yoke is formed. When high electric current is applied to a power supply line 514 that is connected to the magnetizing coil 513 from a magnetizing power source (not illustrated in the figure), magnetic field is generated around the magnetizing coil 513. Here, a magnetic pole appears in a portion of the rotor magnet 507 that makes contact with a protruding pole of the magnetizing yoke. Then, the rotor magnet 507 is magnetized to have alternately and circumferentially disposed N and S poles.

Reduction of uneven magnetization has been demanded for a rotor magnet manufacturing jig. Uneven magnetization is an order component that is lower than the number of magnetic poles in the rotor magnet, and it is originated from coaxial misalignment of the rotor magnet 507 and the magnetizing yoke 512 and/or variation in a position of the magnetizing coil 513, which may cause vibration and noise. In general, winding of the magnetizing yoke 512 is often manually performed. Therefore, for the purpose of reducing effects of uneven processing for an end portion by the magnetizing coil 513, the magnetizing yoke 512, which has height greater than or equal to twice the height of the rotor magnet 507, is used, and the rotor magnet 507 is disposed to be opposed to an approximately center position of the magnetizing yoke 512 in the rotational axis direction. In this state, the rotor magnet 507 is magnetized.

Figure 33A:
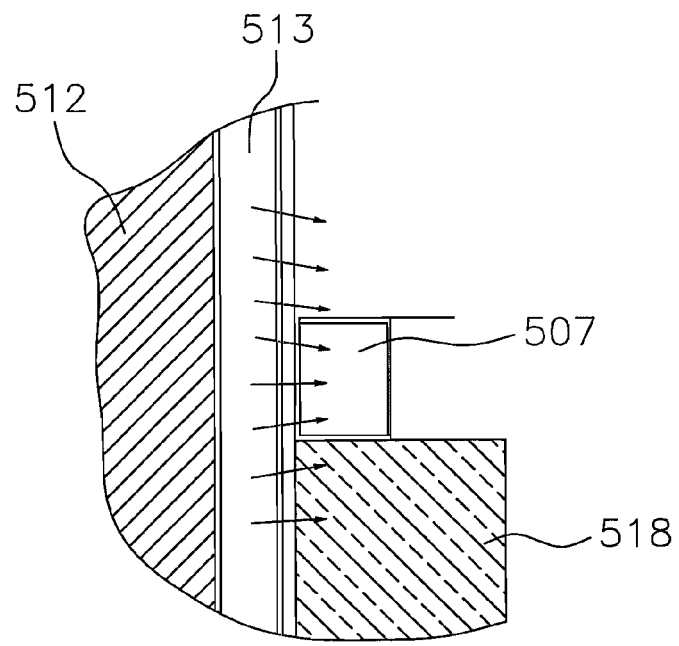
FIG. 33A is a cross-sectional view of an outer-periphery S-pole magnetized portion of a rotor magnet section of the rotor magnet manufacturing jig taken as a comparative example.
Figure 33B:
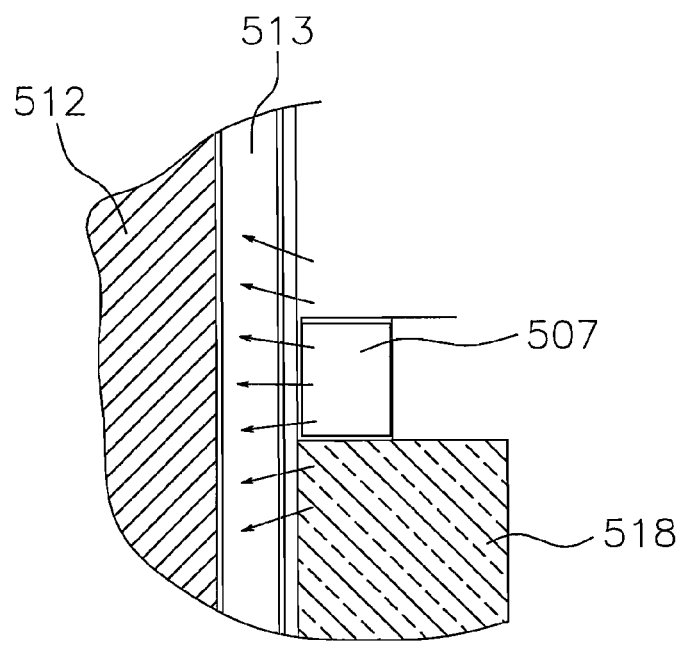
FIG. 33B is a cross-sectional view of an outer-periphery N-pole magnetized portion thereof.

However, as illustrated in FIG. 33A, on a portion of the rotor magnet, the outer periphery of which is magnetized to be the S-pole, the magnetic flux generated from portions of the magnetizing yoke 512, which are positioned outside a portion thereof opposed to the rotor magnet 507, slightly flows into the rotor magnet 507 side. This is because the magnetizing yoke 512 with height greater than that of the rotor magnet 507 is used. On the other hand, as illustrated in FIG. 33B, on a portion of the rotor magnet, the outer periphery of which is magnetized to be the N-pole, the magnetic flux axially-expandingly flows from the rotor magnet 507 toward portions of the magnetizing yoke 512, which are positioned outside a portion thereof opposed to the rotor magnet 507 (when a back yoke is disposed on the opposite side of the magnetizing yoke 512 with respect to the rotor magnet 507, the path of the magnetic flux will be remarkably sloped with respect to the axial direction). In this case, the both end portions of the rotor magnet on the peripheral surface side opposed to the stator core in the rotational axis direction are magnetized to have a magnetizing component flowing axially outward of the rotor magnet.

Figure 41:
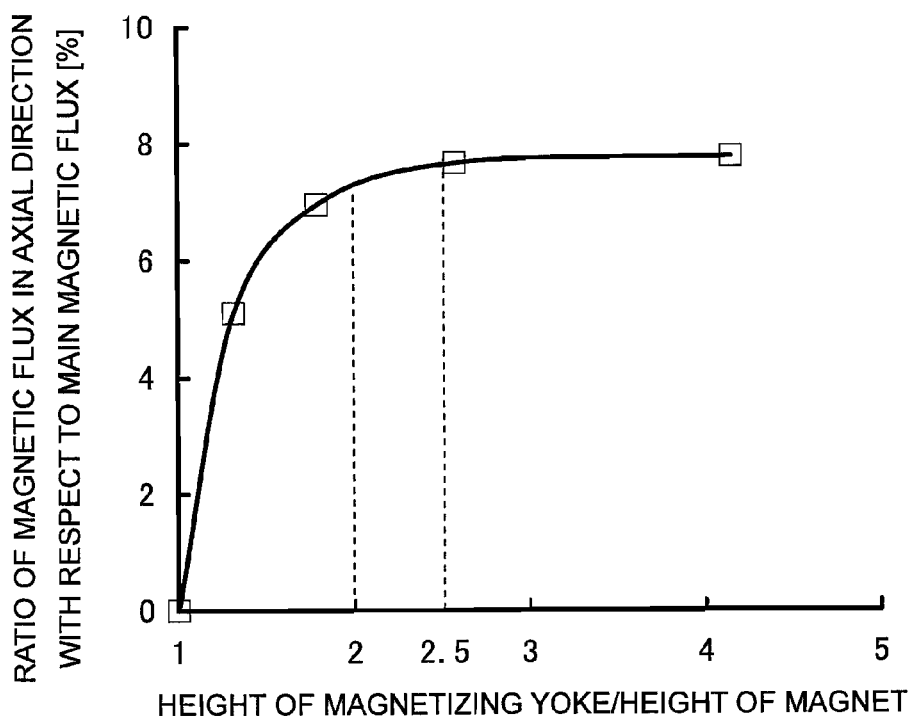
FIG. 41 is a graph showing the result of finite element magnetic field analysis regarding a relation between height of a magnetizing yoke in a rotor magnet manufacturing jig taken as a comparative example and ratio of axially outward magnetic flux with respect to main magnetic flux.

FIG. 41 is a result of the finite-element magnetic field analysis regarding ratio of magnetic flux flowing outward in the rotational axis direction with respect to main magnetic flux based on magnetic flux of the rotor magnet, which is generated when height of the magnetizing yoke is changed with respect to that of the rotor magnet in the rotor magnet manufacturing jig taken as a comparative example. Here, the magnetic flux flowing outward in the rotational axis direction increases as height of the magnetizing yoke increases until height of the magnetizing yoke reaches twice the height of the magnet. Because of this, when height of the magnetizing yoke is greater than or equal to twice the height of the magnet, it is indicated that increasing rate of the ratio of the magnetic flux flowing outward in the rotational axis direction with respect to the main magnetic flux decreases. As illustrated in FIG. 41, both end portions of the rotor magnet in the rotational axis direction are magnetized to have a magnetizing component flowing outward in the rotational axis direction, respectively, by the use of the magnetizing yoke with height greater than that of the rotor magnet. Furthermore, height of the magnetizing yoke is greater than or equal to twice the height of the rotor magnet, and increasing rate of the ratio of the magnetic flux flowing outward in the rotational axis direction with respect to the main magnetic flux is small. Therefore, influence by the magnetic field that is generated from external portions of the magnetizing yoke having height greater than or equal to twice the height of the rotor magnet. Accordingly, when height of the magnetizing yoke is set to be greater than or equal to twice the height of the rotor magnet, it is possible to assume that connection of a coil end portion of the magnetizing yoke does not have much effect on the rotor magnet to be magnetized.

Figure 30:
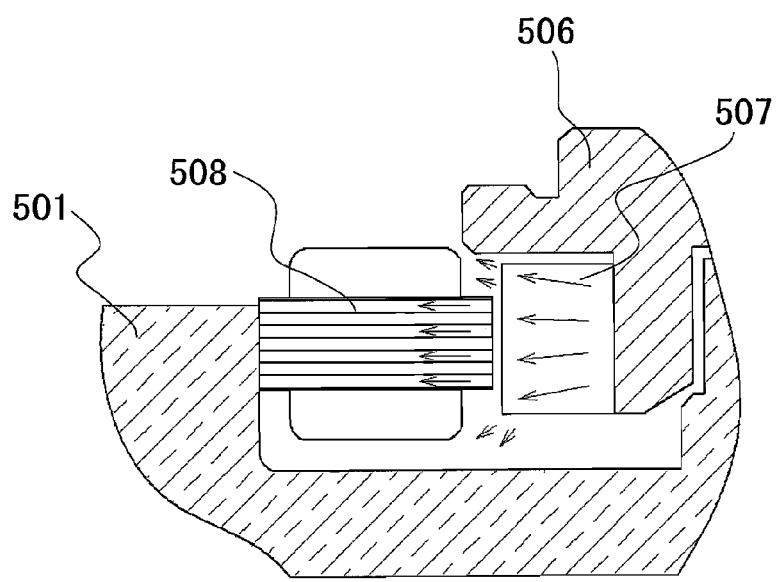
FIG. 30 is a detailed cross-sectional view of a spindle motor taken as a comparative example.
Figure 31:
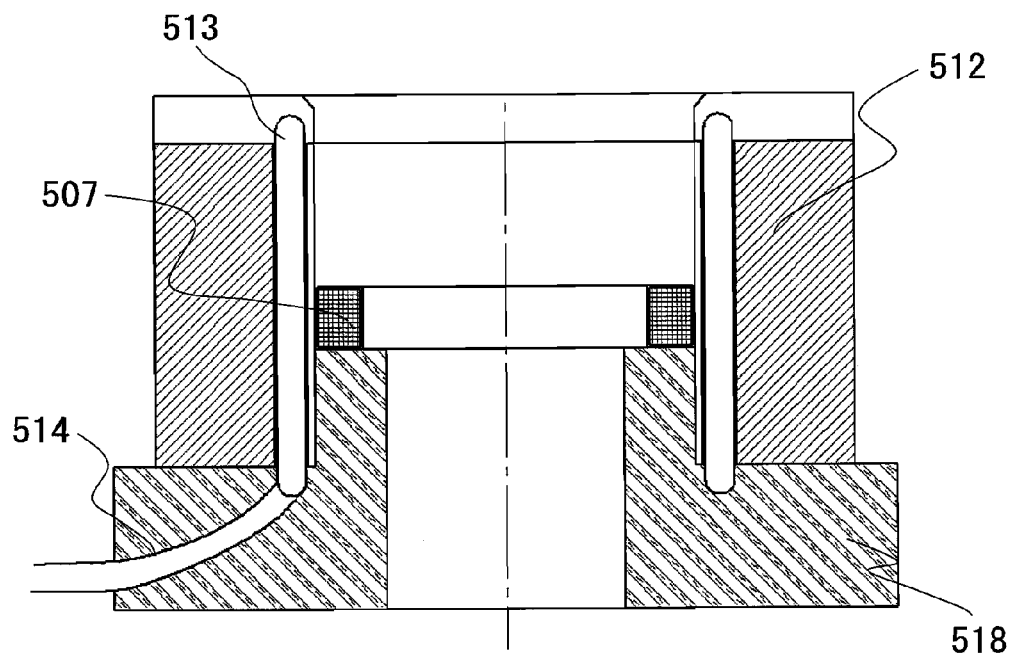
FIG. 31 is a cross-sectional view of a rotor magnet manufacturing jig taken as a comparative example.
Figure 32:
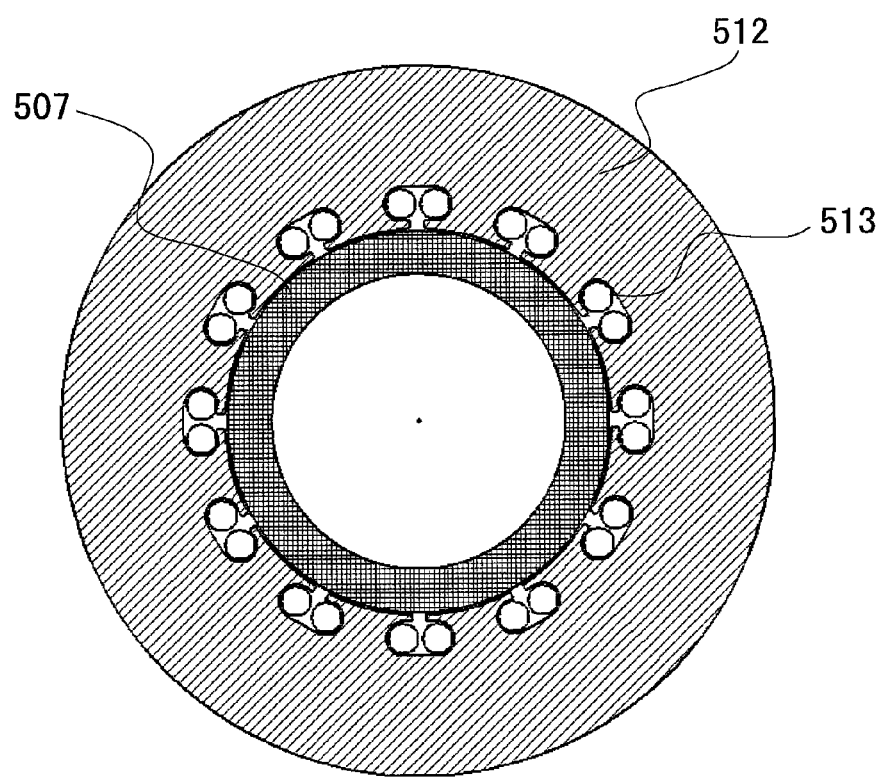
FIG. 32 is a cross-sectional view of a rotor magnet-manufacturing jig taken as a comparative example in a direction perpendicular to the rotational axis.

Therefore, when a rotor magnet 507 magnetized with a rotor magnet manufacturing jig taken as a comparative example is mounted in a spindle motor, as illustrated in FIG. 30, leakage magnetic flux from the lower portion of the rotor magnet 507 to a base 501 made of magnetic material will be increased. Because of this, magnetic attraction will be increased between the rotor magnet 507 and the base 501. In this case, eddy current is increased on the surface of the base 501 by the increase of the loss torque in the thrust hydrodynamic bearing unit 511 and the increase of the leakage magnetic flux to the base 501, and thus electric current consumption will be increased. In addition, it is possible to assume that the leakage magnetic flux from the rotor magnet 507 not to a stator core 508 but to a rotor part 506 and furthermore to a recording medium disk will be increased on the surface of the rotor magnet 507, which is positioned on the opposite side of the base 501, and thus the increasing leakage magnetic flux will be a cause of data error in the recording medium disk.

On the other hand, as illustrated in FIGS. 21-26, the manufacturing jig for the rotor magnet 307 of the present embodiment is disposed to make contact with the outer peripheral surface of the rotor magnet 307, and the rotor magnet 307 is disposed to be opposed to an approximately center part of a magnetizing yoke 312 with height sufficiently greater than that of the rotor magnet 307 in the rotational axis direction. In addition, one of the surfaces of the rotor magnet 307 in the rotational axis direction is supported by the first support portion 315 that is made of magnetic material such as iron and stainless. Furthermore, the other of the surfaces of the rotor magnet 307 in the rotational axis direction is similarly supported by the second support portion 316 that is made of magnetic material such as iron and stainless. Therefore, as illustrated in FIG. 23A, on a portion of the rotor magnet 307, the outer periphery of which is magnetized to be the S-pole, the magnetic flux that is generated from portions of the magnetizing yoke 312, which are positioned outside a portion thereof opposed to the rotor magnet 307, flows into the first support portion 315 and the second support portion 316. Because of this, it is possible to reduce the magnetic flux that flows from the end portions of the rotor magnet 307 toward the center of the rotor magnet 307. Also, magnetic permeability of the first support portion 315 and the second support portion 316 that are made of magnetic material is greater than that of the rotor magnet 307. Therefore, the magnetic flux in the center portion of the magnetizing yoke opposed to the rotor magnet flows toward the first support portion 315 and the second support portion 316. Because of this, the both end portions of the rotor magnet 307 in the rotational axis direction are magnetized to have an outward component in a rotational axis direction of the rotor magnet 307.

Figure 23A:
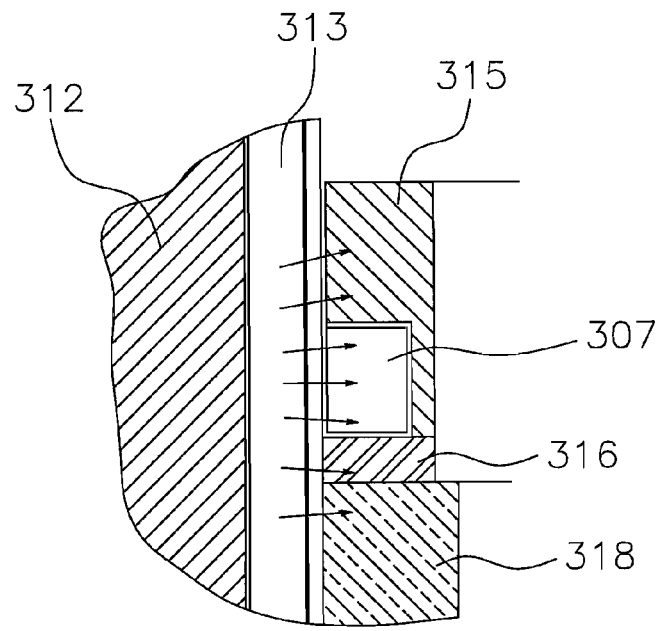
FIG. 23A is a cross-sectional view of an outer-periphery S-pole magnetized portion of the rotor magnet section of the rotor magnet section of the rotor magnet manufacturing jig of the second embodiment of the present invention.
Figure 23B:
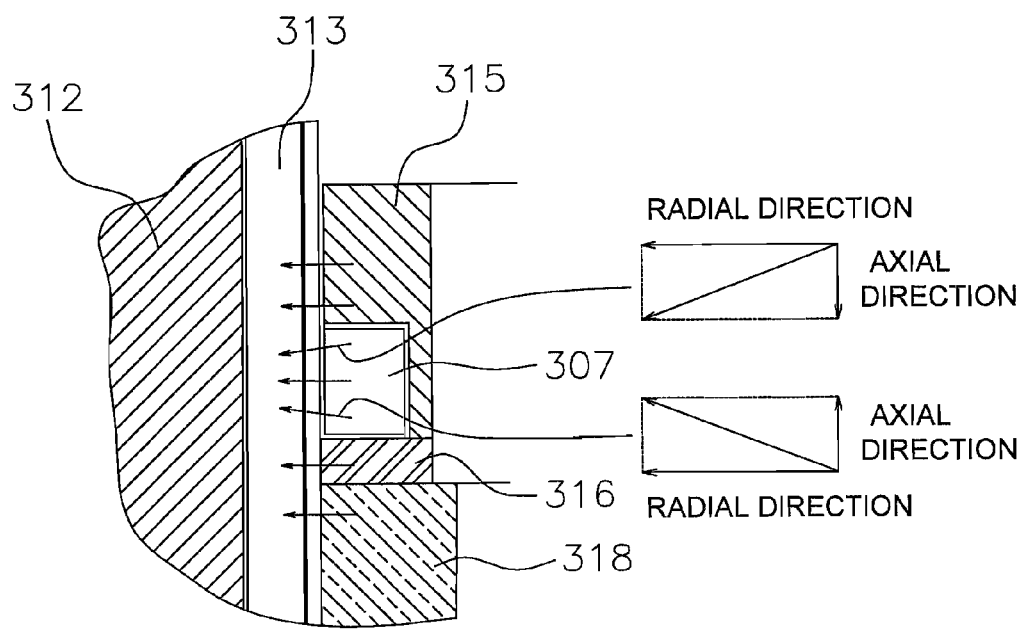
FIG. 23B is a cross-sectional view of an outer-periphery N-pole magnetized portion thereof.

On the other hand, as illustrated in FIG. 23B, on a portion of the rotor magnet 307, the outer periphery of which is magnetized to be the N-pole, magnetic permeability of the magnetic flux that is generated from portions of the magnetizing yoke 312, which are positioned outside a portion thereof opposed to the rotor magnet 307, with respect to the rotor magnet 307, is greater than magnetic permeability of the magnetic flux with respect to the first support portion 315 and the second support portion 316 that are made of magnetic material. Accordingly, the magnetic flux flows into the center portion of the magnetizing yoke, which is opposed to the rotor magnet, from directions of the first support portion 315 and the second support portion 316. Because of this, both end portions of the rotor magnet 307 in the rotational axis direction are magnetized to have a magnetizing component flowing toward the center of the rotor magnet 307 in the rotational axis direction. Therefore, the outer peripheral surface of the rotor magnet 307, which is the surface to be magnetized, is magnetized to have a magnetizing component flowing toward the axially-center direction.

Figure 24:
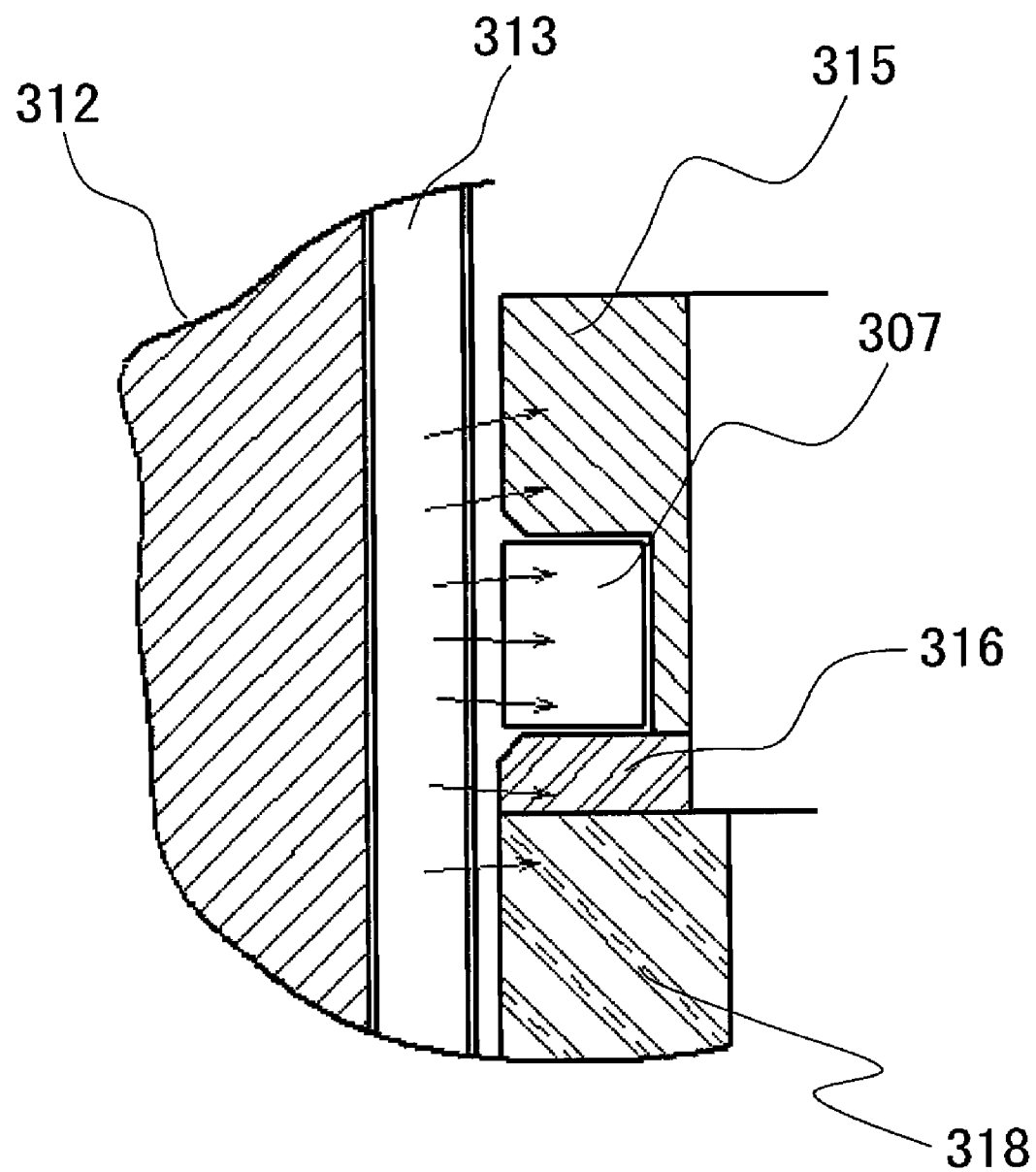
FIG. 24 is a detailed cross-sectional view of the rotor magnet section of the rotor magnet manufacturing jig of the second embodiment of the present invention.
Figure 25:
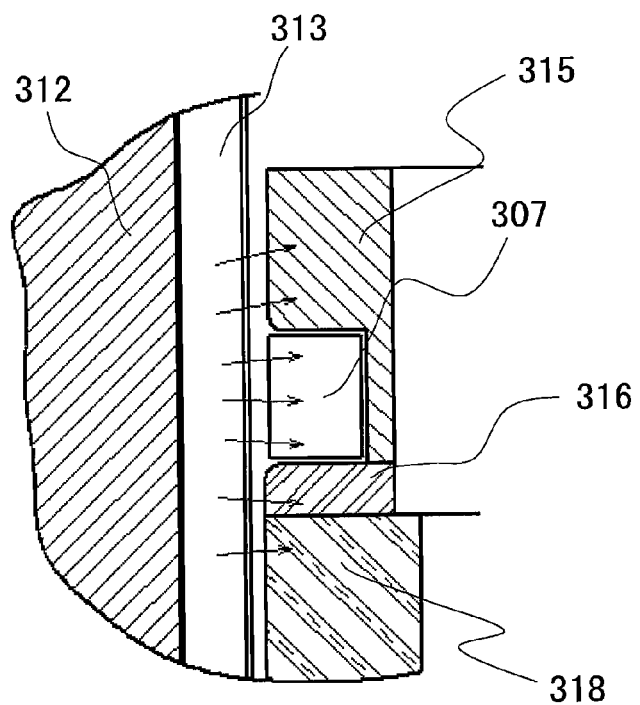
FIG. 25 is a detailed cross-sectional view of the rotor magnet section of the rotor magnet manufacturing jig of the second embodiment of the present invention.
Figure 26:
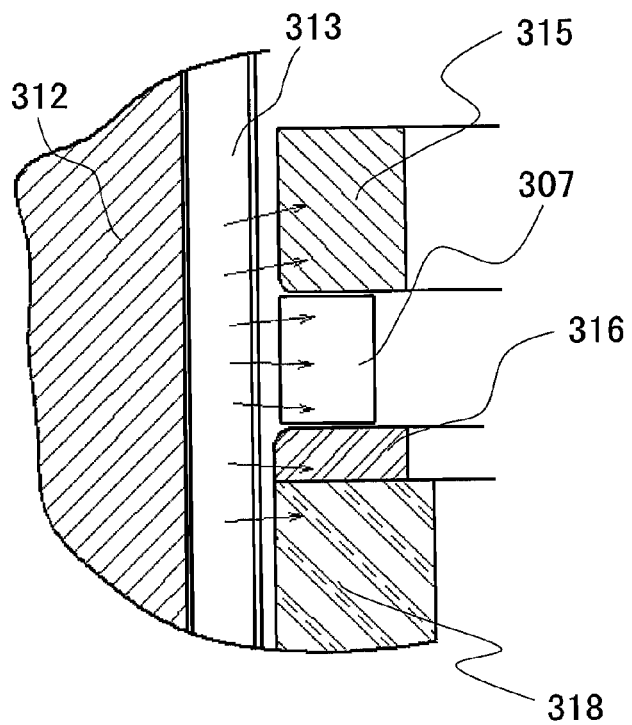
FIG. 26 is a detailed cross-sectional view of the rotor magnet section of the rotor magnet manufacturing jig of the second embodiment of the present invention.

In addition, as illustrated in FIGS. 24 and 25, when the first support portion 315 and the second support portion 316 are configured to have a chamfer portion or an R-portion on the end surface that is opposed to the rotor magnet 307, respectively, it is possible to alleviate concentration and/or turbulence of the magnetic flux on the edge portion, and thus it is possible to stably magnetize the rotor magnet 307. In addition, as illustrated in FIG. 26, even when the first support portion 315 only makes contact with an end surface of the rotor magnet 307, it is possible to achieve the similar effect.

Figure 29:
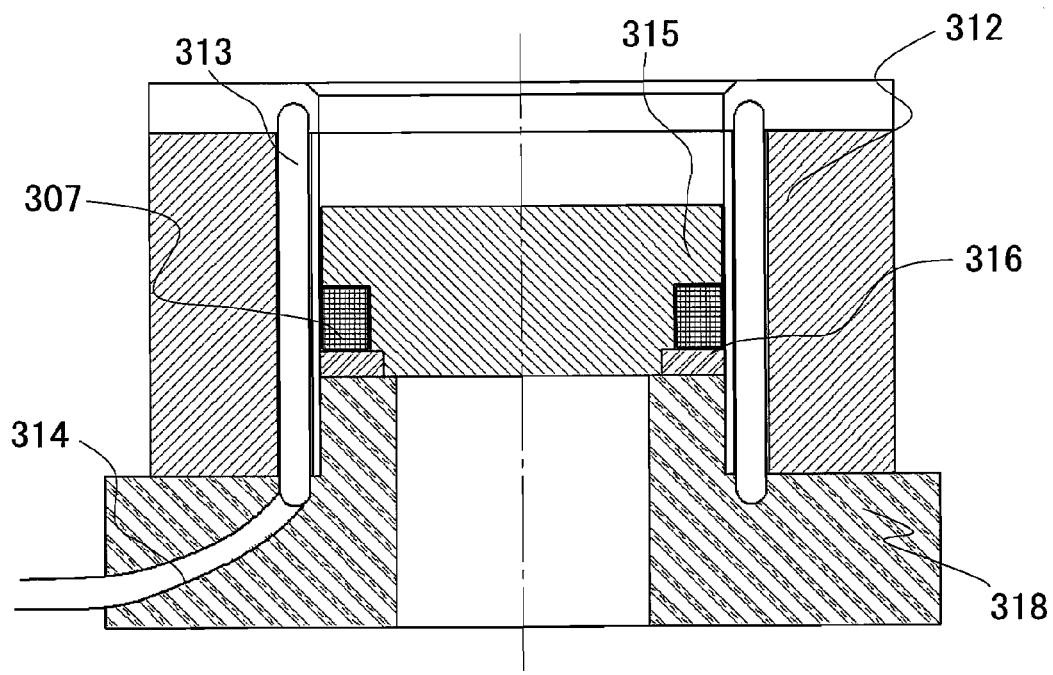
FIG. 29 is a cross-sectional view of an alternative rotor magnet manufacturing jig of the second embodiment of the present invention.
Figure 42:
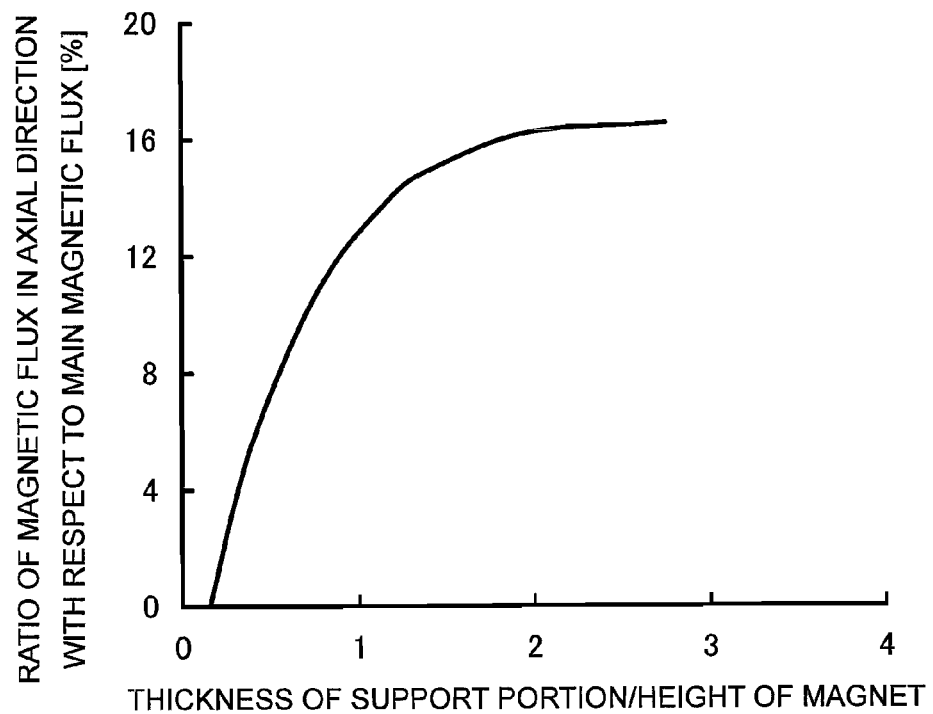
FIG. 42 is a graph showing the result of finite element magnetic field analysis regarding a relation between thickness of a support portion in a rotor magnet manufacturing jig of the present invention and ratio of axially inward magnetic flux with respect to main magnetic flux.

FIG. 42 illustrates the magnetic flux of the rotor magnet that is generated when thickness of the first support portion 315 and that of the second support portion 316 in the rotational axis direction are changed in the rotor magnet manufacturing jig of the present invention. Here, FIG. 42 shows a result of the finite element magnetic field analysis regarding ratio of the magnetic flux flowing inward in the rotational axis direction with respect to the main flux. From the result, it is found that the magnetic flux flowing inward in the rotational axis direction is increased as the thickness of the support portion is increased, and it is possible to regulate attraction and the leakage magnetic flux by the optimum thickness of the support portion. Therefore, as illustrated in FIG. 29, even when the first support portion 315 is formed in a solid-core shape, it is possible to achieve the similar effect.

Accordingly, when a rotor magnet 307 magnetized with a rotor magnet manufacturing jig of the present invention is mounted in a spindle motor, as illustrated in FIG. 20, the leakage magnetic flux from the lower portion of the rotor magnet 307 to the base 301 made of magnetic material will be reduced. With the configuration, magnetic attraction will be reduced between the rotor magnet 307 and the base 301. In addition, eddy current is reduced on the surface of the base 301 by the reduction of loss torque in the thrust hydrodynamic bearing unit 311 and the reduction of the leakage magnetic flux to the base 301, and thus electric current consumption will be reduced. Also, the amount of leakage magnetic flux from the rotor magnet 307 not to the stator core 308 but to the rotor part 306 and further to a recording medium disk (not illustrated in the figure) that is mounted on the rotor part 306 will be reduced on the surface of the rotor magnet 307 on the opposite side of the base 301. Accordingly, it is possible to reduce data error to be generated in the recording medium disk. In the second embodiment, it is conceivable that relative positions of the magnetic polar boundary lines on the both end surfaces of the rotor magnet 307 in the first embodiment are approximately the same. However, it is conceivable that absolute positions of them are moved in the radial direction. Also, for the purpose of achieving the same level of attraction and the same amount of leakage magnetic flux to the disk surface as those of the comparative example, it is possible to provide a configuration that a gap between the rotor magnet 307 and the base 301 is reduced and distance from the rotor magnet 307 to the disk surface is reduced. However, there is a possibility that other motor properties are thereby deteriorated. According to the rotor magnet 307 of the present embodiment, it is possible adjust attraction and leakage magnetic flux while impact on other motor properties are inhibited. Therefore, it becomes possible to produce small and low-profile spindle motor and magnetic recording device.

Third Embodiment

A third embodiment of the present invention is explained with reference to FIGS. 34-39.

Figure 34:
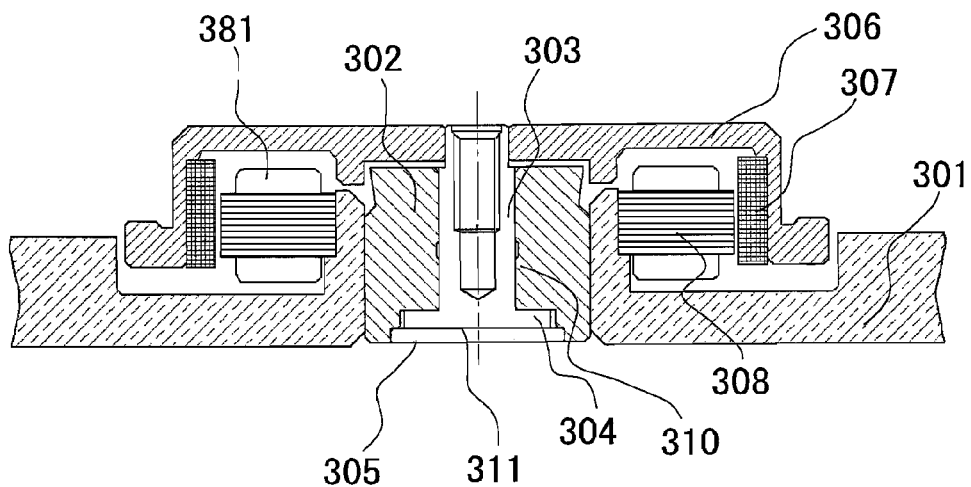
FIG. 34 is a cross-sectional view of an outer rotor type spindle motor of a third embodiment of the present invention.
Figure 36:
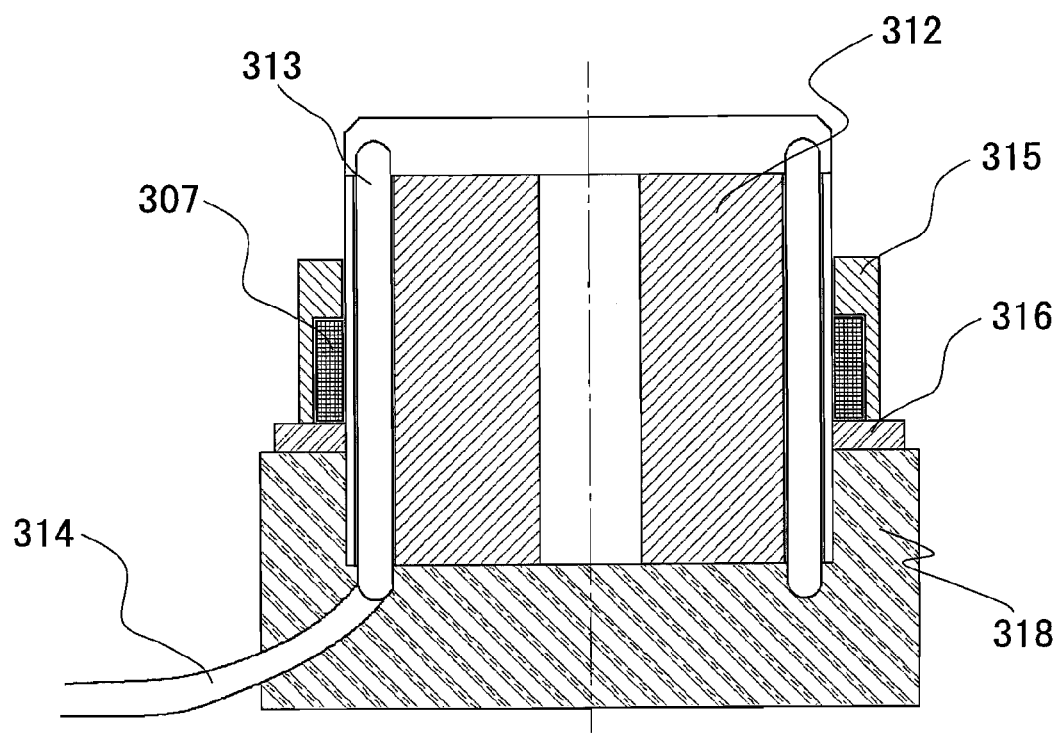
FIG. 36 is a cross-sectional view of a rotor magnet manufacturing jig of the third embodiment of the present invention.
Figure 37:
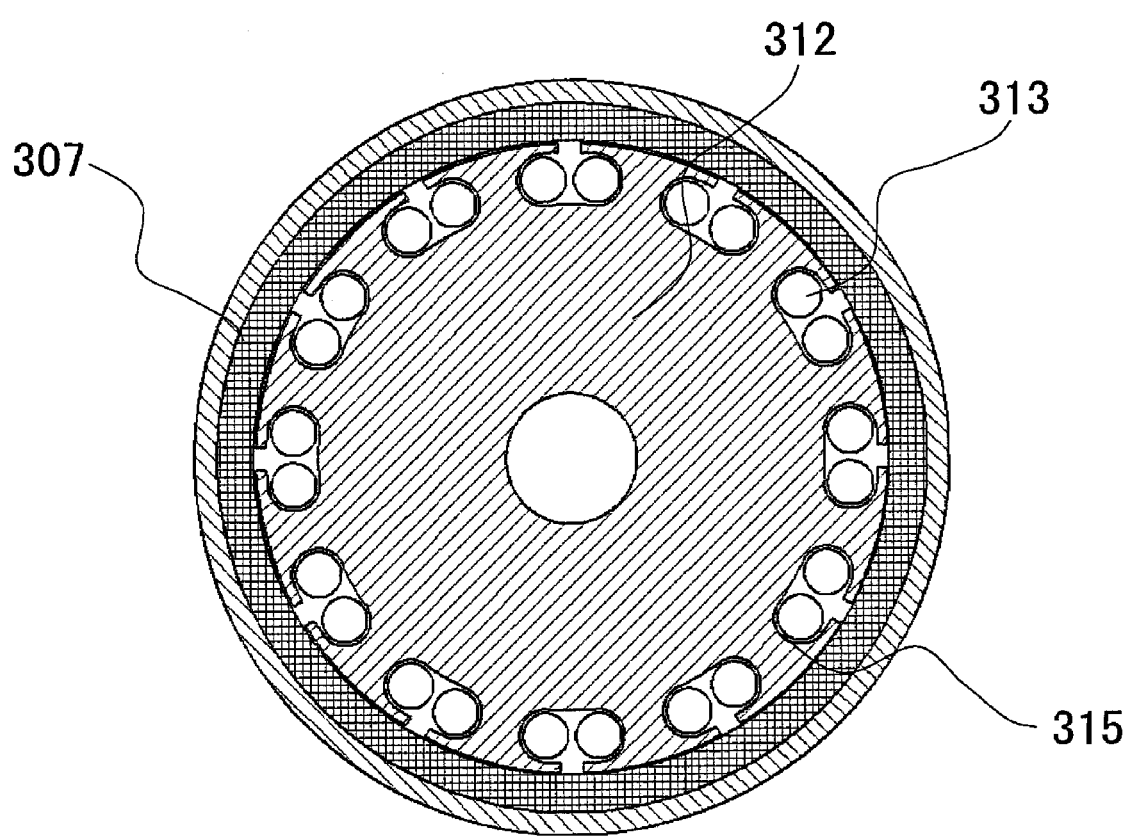
FIG. 37 is a cross-sectional view of the rotor magnet manufacturing jig of the third embodiment of the present invention in a direction perpendicular to the rotational axis.
Figure 38A:
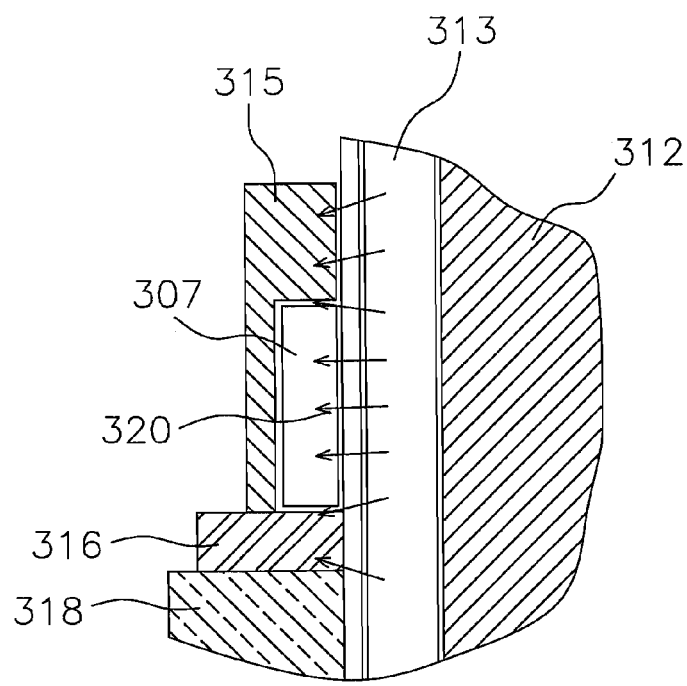
FIG. 38A is a cross-sectional view of an outer-periphery S-pole magnetized portion of a rotor magnet section of the rotor magnet manufacturing jig of the third embodiment of the present invention.
Figure 38B:
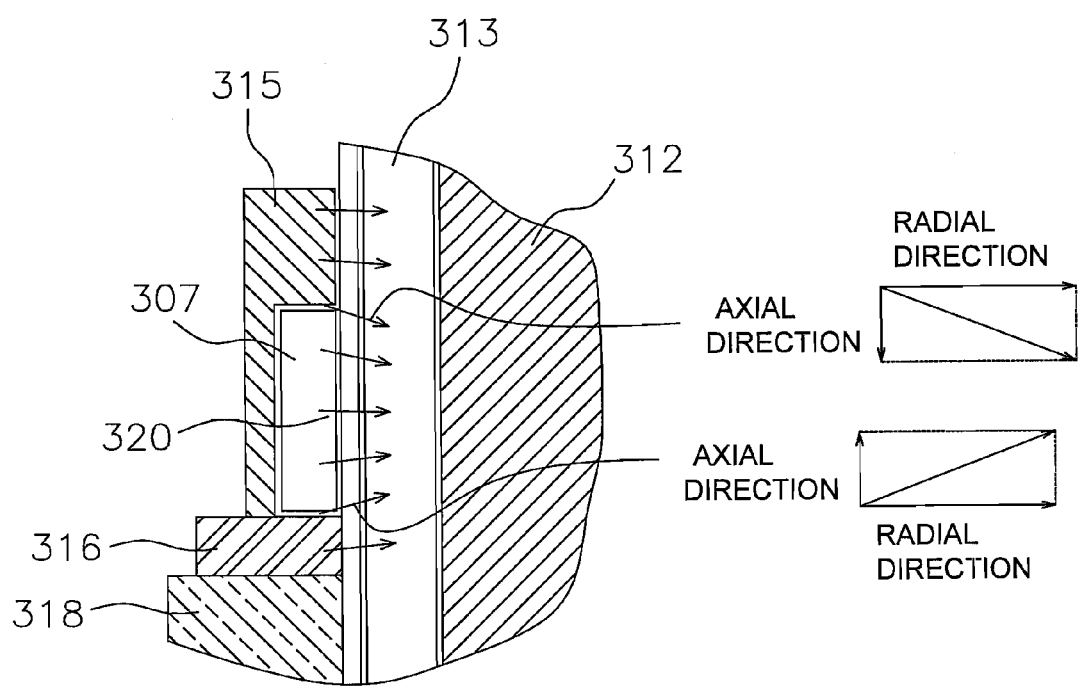
FIG. 38B is a cross-sectional view of an outer-periphery N-pole magnetized portion thereof.

FIG. 34 is a cross-sectional view of a spindle motor of the third embodiment of the present invention. FIGS. 36-38 illustrate a method of manufacturing a rotor magnet and a magnetizing system of the present embodiment. Note that an outer rotor type spindle motor is used in the present embodiment, but the basic configuration thereof is approximately the same as the above described second embodiment. Therefore, the present embodiment will be explained by focusing on differences from the second embodiment.

In the present embodiment, as illustrated in FIG. 34, a stator core 308 is fitly attached to a base 301. Here, the stator core 308 is made of lamination of electromagnetic steel plates. In addition, a coil winding 381 is wound around each of a plurality of protruding poles that are disposed in the stator core 308 and radially protrude in the radially-outward direction.

Furthermore, a rotor portion 306 is an approximately cup-shaped member that is made of stainless steel. A recording medium disk such as a magnetic disk (not illustrated in the figure) is configured to be fixed to the rotor portion 306 by pressing force applied from the upside of a damper (not illustrated in the figure).

In addition, an annular rotor magnet 307 is attached to the inner peripheral wall side of the rotor part 306. Furthermore, the rotor magnet 307 is disposed to be adjacently and annularly opposed to the outer peripheral end surface of each of the protruding poles in the above described stator core 308. The bottom surface of the rotor magnet 307 and the stationary base 301 made of magnetic material are disposed to be axially opposed to each other through a constant gap. The leakage magnetic flux from the rotor magnet 307 works as magnetic attraction on a portion of the base 301, which is located to be opposed to the bottom surface of the rotor magnet 307. Therefore, regulation of a thrust position of an entire rotational body including the rotor part 306, a rotational axis 303, and the like is well-maintained regardless of a posture of the rotational body.

Here, as illustrated in FIGS. 36-38, the stator core 308 is disposed on the outer peripheral side when a motor is assembled in the present embodiment. Therefore, in a rotor magnet manufacturing jig of the present embodiment, the rotor magnet 307 is disposed to be opposed to an approximately center portion of the magnetizing yoke 312 with height sufficiently greater than that of the rotor magnet 307 in the rotational axis direction, and the magnetizing yoke 12 is also disposed to make contact with the outer peripheral surface of the rotor magnet 307. In addition, one of the surfaces of the rotor magnet 307 in the rotational axis direction is supported by a first support portion 315 that is made of magnetic material such as iron and stainless. Furthermore, the other of the surfaces of the rotor magnet 307 in the rotational axis direction is similarly supported by a second support portion 316 that is made of magnetic material such as iron and stainless. Therefore, the magnetic field that is generated from portions of the magnetizing yoke 312, which are positioned outside a portion thereof opposed to the rotor magnet 307, flows into the first support portion 315 and the second support portion 316. Because of this, it is possible to reduce the magnetic flux that flows from the end portions of the rotor magnet 307 toward the center of the rotor magnet 307. On the contrary, magnetic permeability of the first support portion 315 and the second support portion 316 that are made of magnetic material is greater than that of the rotor magnet 307. Therefore, the magnetic flux that is generated form an axially-center part of the magnetizing yoke, which is opposed to the rotor magnet, also flows toward the first support portion 315 and the second support portion 316. Because of this, both end portions of the rotor magnet 307 are magnetized to have a magnetizing component flowing toward the center part of the rotor magnet 307 in the rotational axis direction. Accordingly, the inner peripheral surface of the rotor magnet 307, which is the surface to be magnetized, is magnetized to have a magnetizing component flowing toward the center part of the rotor magnet 307 in the rotational axis direction.

Figure 35:
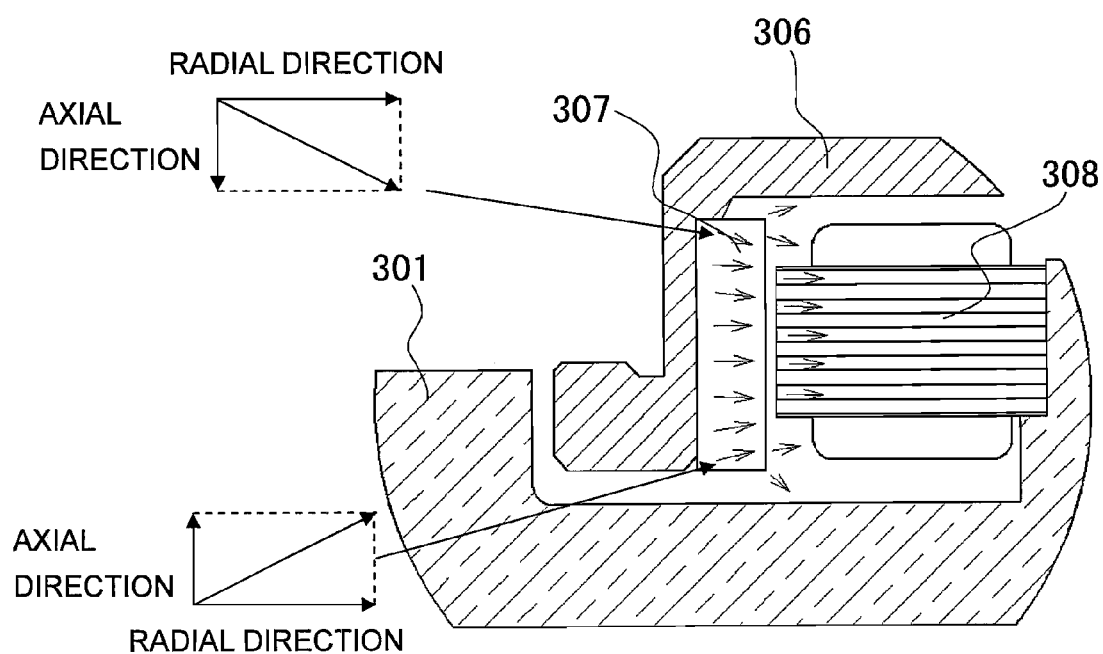
FIG. 35 is a detailed cross-sectional view of a rotor magnet section of the spindle motor of the third embodiment of the present invention.

Therefore, when a rotor magnet 307, which is magnetized with a rotor magnet manufacturing jig of the present embodiment, is mounted in a spindle motor, as illustrated in FIG. 35, the leakage magnetic flux from a lower portion of the rotor magnet 307 to the base 301 made of magnetic material will be reduced. With the configuration, magnetic attraction will be reduced between the rotor magnet 307 and the base 301. Accordingly, eddy current is reduced on the surface of the base 301 by the reduction of the loss torque in the thrust hydrodynamic bearing unit 311 and the reduction of the leakage magnetic flux to the base 301, and thus it is possible to reduce electric current consumption. In addition, on the surface of the rotor magnet 307, which is disposed on the opposite side of the base 301, magnetic flux also flows from the rotor magnet 307 not to the stator core 308 but to the rotor part 306, and thus the leakage magnetic flux to a recording medium disk will be reduced. Therefore, it is possible to reduce occurrence of data error in the recording medium disk.

Also, when the same level of attraction and the same amount of leakage magnetic flux to the disk surface as those of the comparative example are achieved, it is possible to provide a configuration that a gap between the rotor magnet 307 and the base 301 is reduced and/or distance from the rotor magnet 307 to the disk surface is reduced. However, there is a possibility that other motor properties are thereby deteriorated. According to the rotor magnet 307 of the present embodiment, it is possible to adjust attraction and leakage magnetic flux while impact on the other motor properties is inhibited. Therefore, it becomes possible to produce small and low-profile spindle motor and magnetic recording device.

The invention produced by the inventors of the present application has been specifically explained based on the above described embodiments. However, the present invention is not limited to the above described embodiments, and a variety of changes are possible without departing from the scope of the present invention.

Figure 39:
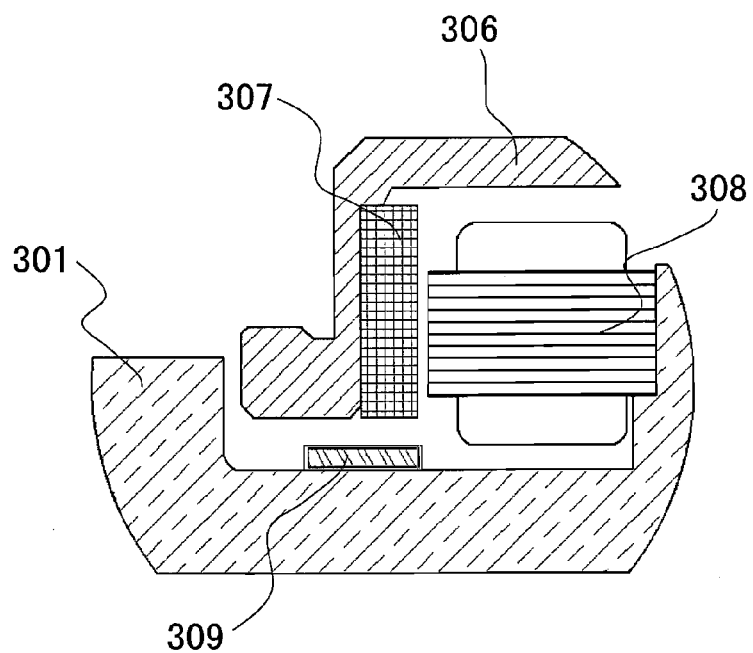
FIG. 39 is a detailed cross-sectional view of a spindle motor of the third embodiment of the present invention.

For example, as illustrated in FIG. 39, when a base 301 is made of non-magnetic material such as aluminum and a attraction ring 309 (magnetic attraction portion) for attracting magnetism is disposed on the base 301 so as to be opposed to the bottom surface of the rotor magnet 307, it is possible to achieve the similar effect.

Also, the present invention is applied to the HDD spindle motor in each of the above described embodiments. However, it is possible to similarly apply the present invention to a spindle motor that is configured to be used for a spindle motor without a hydrodynamic bearing unit, or a variety of machines excluding the HDD spindle motor.

Alternative Embodiments

As described above, some embodiments of the present invention have been explained. However, the present invention is not limited to the above described embodiments, and a variety of changes are possible without departing from the scope of the present invention.

Alternative Embodiment (A)

In the above described embodiment, the spindle motor 20 illustrated in FIG. 5A is exemplified. Specifically, the rotor magnet 7 is attached to the spindle motor 20, and the rotor magnet 7 is configured such that the circumferentially-extending magnetic polar boundary line Mc is formed for reducing attraction on the axially-lower surface (bottom surface 7c) side. However, the present invention is not limited to the configuration.

Figure 11:
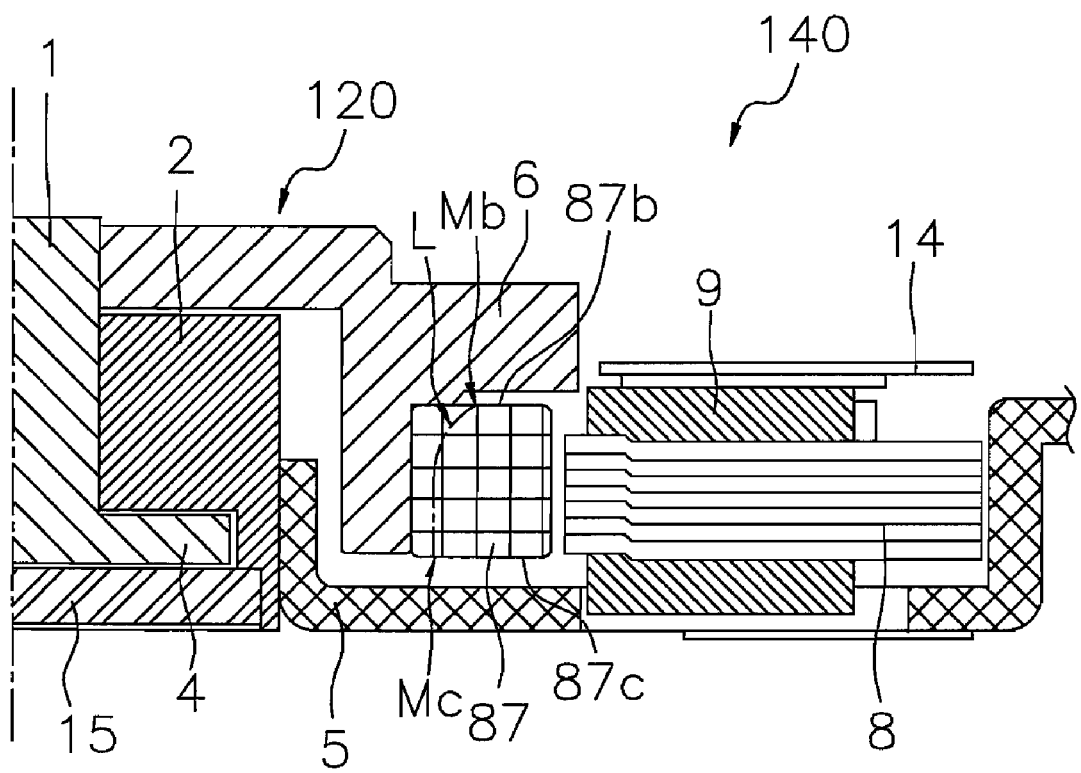
FIG. 11 is an enlarged schematic view illustrating a configuration of a rotor magnet disposed in a HDD of an alternative embodiment of the present invention and the periphery thereof.

For example, a spindle motor 120 (HDD 140) illustrated in FIG. 11 may be used. Contrary to the above described embodiment, a rotor magnet 87 is attached to the spindle motor 120 in a state that the magnetic polar boundary line Mb, which circumferentially extends on the top surface 87b side of the rotor magnet, is positioned in an radially-outward position (i.e., the rotor magnet 7 is attached to the spindle motor 120 in the opposite direction).

Figure 12:
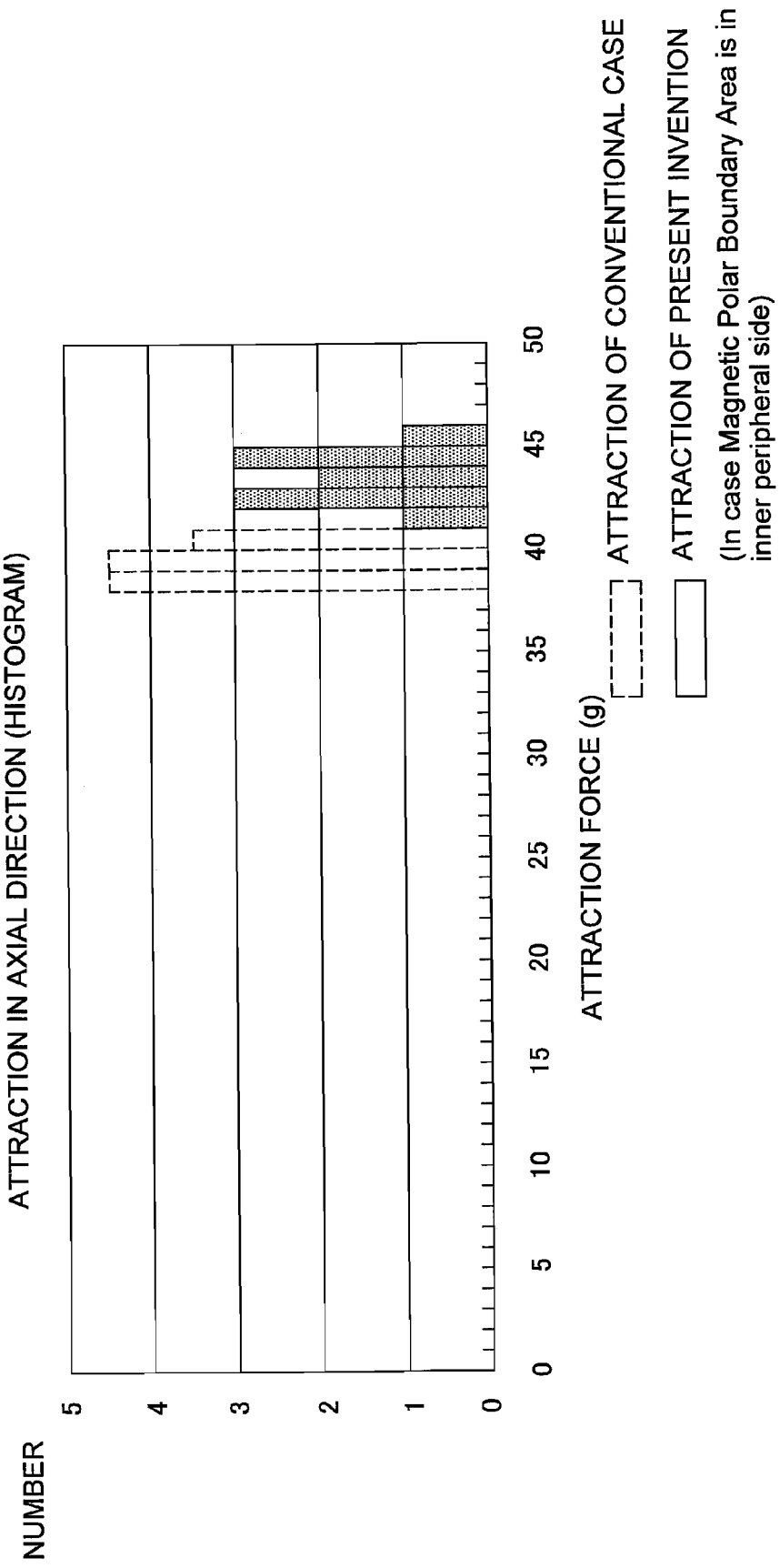
FIG. 12 is a graph in accordance with alternative embodiment of the present invention, which illustrates variation of axial attraction of the rotor magnet illustrated in FIG. 11.

In this case, contrary to the configuration illustrated in FIG. 4, the leakage magnetic flux toward the head unit 12 (see FIG. 3) disposed on a radially-upper position is reduced, and accordingly adverse effects on the head unit 12 will be reduced. Furthermore, as illustrated in FIG. 12, axially-downward attraction force is 42-46 g, and becomes slightly greater than that of the conventional configuration (illustrated by dot-line: 39-41 g).

Because of this, it is possible to enhance axial stiffness by increasing attraction, and it is also possible to reduce leakage magnetic flux from the axially-upper side (i.e., from rotor hub 6 side). As a result, it is possible to achieve a vibration-resistant and impact-resistant spindle motor in which the leakage magnetic flux to the head side is reduced.

Alternative Embodiment (B)

In the above described embodiment, a magnetization process of the rotor magnet 7 is exemplified as illustrated in FIG. 5A. Here, the magnetic polar boundary line Mb, which circumferentially extends on the top surface 7b of the rotor magnet, or the magnetic polar boundary line Mc, which circumferentially extends on the bottom surface 7c of the rotor magnet, is positioned in a radially-outside position. However, the present invention is not limited to the configuration.

For example, the rotor magnet may be magnetized so that the magnetic polar boundary lines Mb and Mc, which circumferentially extend on the top and bottom surfaces, are positioned radially-outside a magnetizing boundary line Lm. Here, the magnetizing boundary line Lm circumferentially extends in the vicinity of the axially-center part of the rotor magnet.

Figure 13:
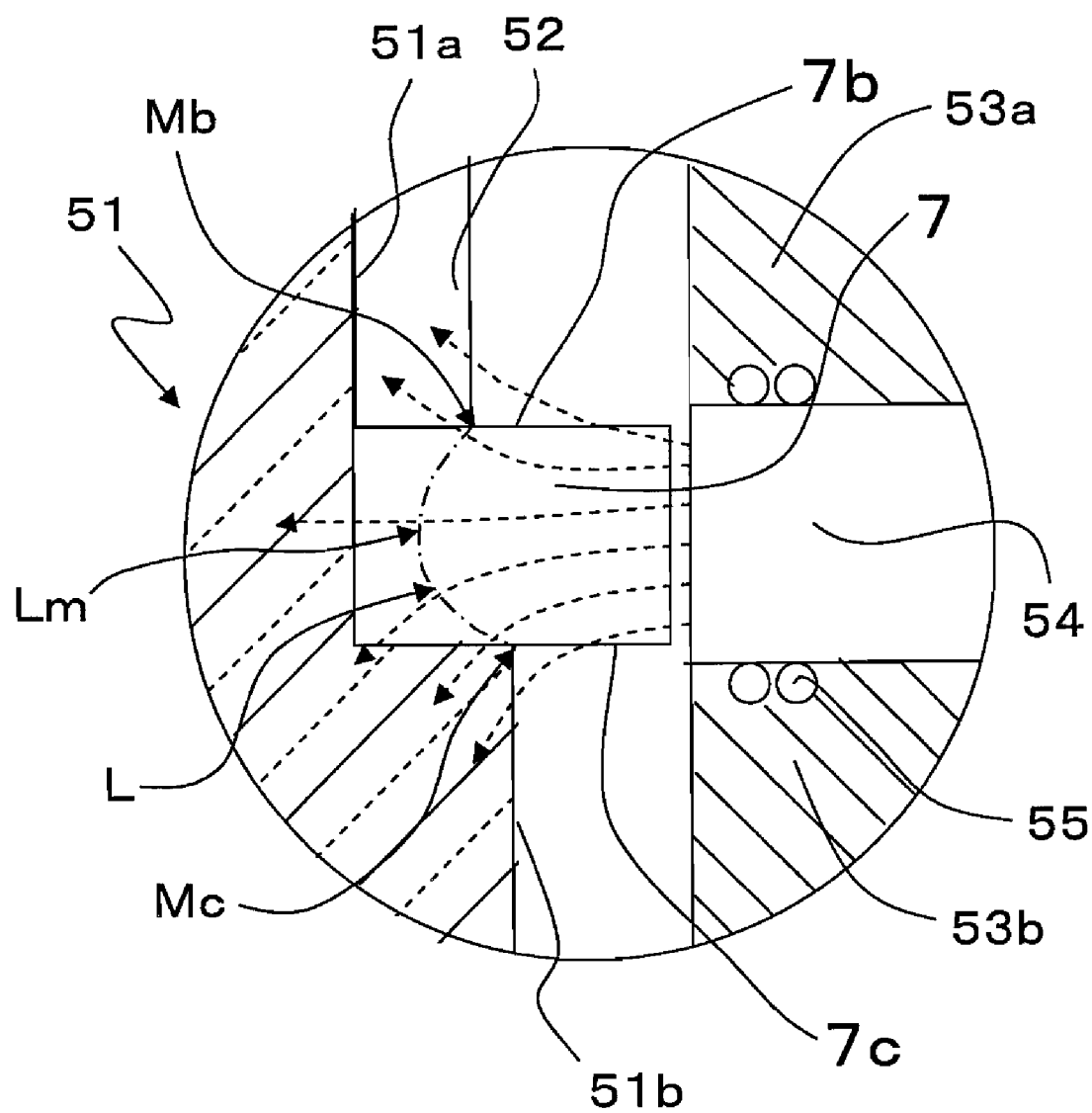
FIG. 13 is a cross-sectional view illustrating a configuration of a manufacturing jig in which a yoke member is disposed on the both sides of the rotor magnet of an alternative embodiment of the present invention.

Specifically, in the above described example illustrated in FIG. 5A, the magnetic polar boundary line L, which circumferentially extends only on the bottom surface 7c, is changed to flow in a direction including an axial component. However, without this change, for example, it is possible to magnetize the rotor magnet while the top and bottom surfaces thereof are received by magnetic material, by changing the material forming the presser member from resin material to magnetic material as illustrated in FIG. 13. Accordingly, a configuration may be used that the magnetic polar boundary lines Mb and Mc, which circumferentially extend on the top and bottom surfaces, are positioned radially-outside the magnetic polar boundary line Lm, which circumferentially extends in the vicinity of the center part of the magnetic polar boundary line L.

With a configuration that thus magnetized rotor magnet 7 is mounted in the spindle motor, it is possible to reduce axially-downward attraction. Accordingly, it is possible to achieve a spindle motor in which abrasion to be generated between members of the thrust bearing unit during the start-up or the like is reduced and the leakage magnetic flux to the head side is also reduced.

Alternative Embodiment (C)

In the above described embodiment, the manufacturing jig 50 is exemplified as illustrated in FIGS. 7A and 7B. Here, the manufacturing jig 50 is a so-called outer periphery magnetization manufacturing jig in which the rotor magnet 7 is magnetized by applying electric current to the coil 55 wound around the magnetizing yoke 54 that is disposed radially-outside the rotor magnet 7. However, the present invention is not limited to the configuration.

Figure 14:
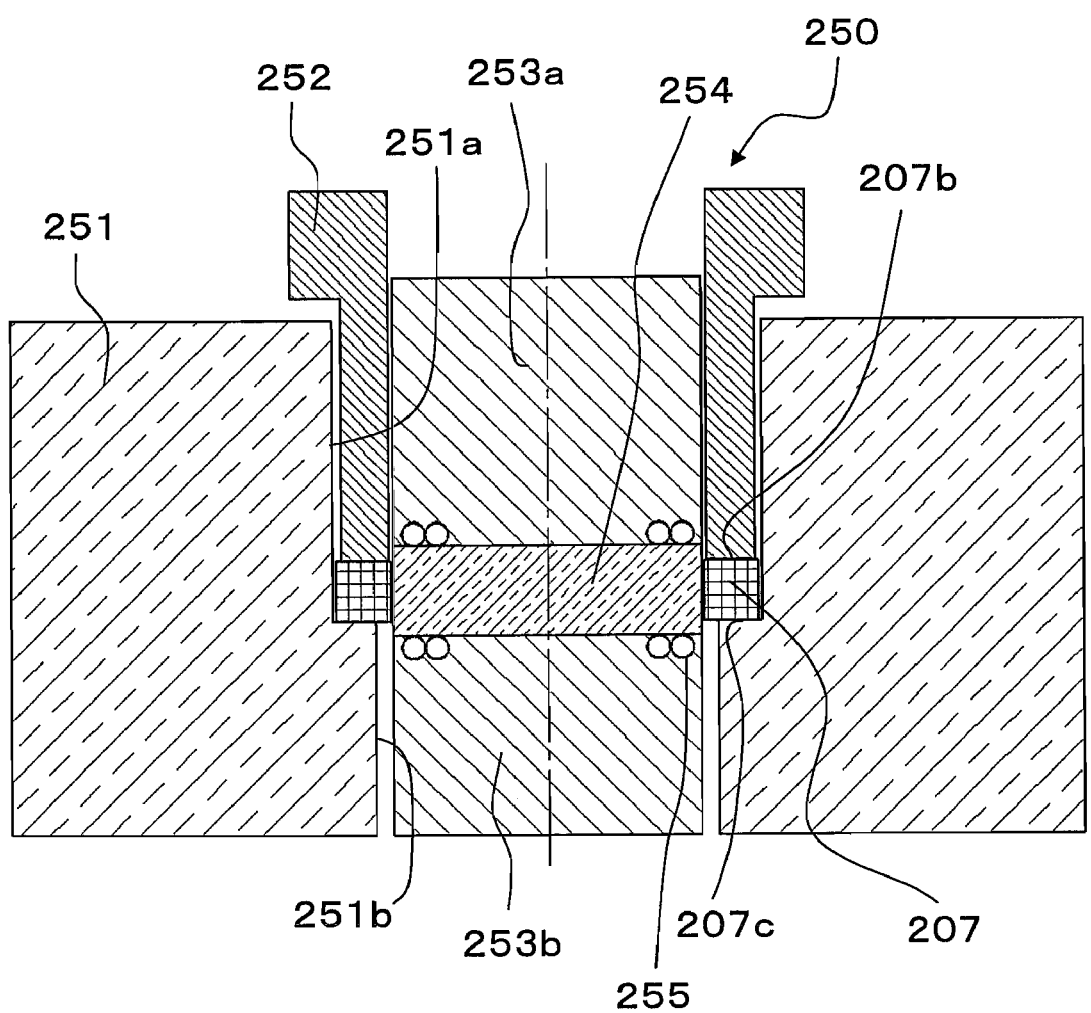
FIG. 14 is a cross-sectional view illustrating a configuration of a magnetizing jig seen from the inner peripheral side of the rotor magnet of an alternative embodiment of the present invention.

For example, a so-called inner periphery magnetization manufacturing jig may be applied as illustrated in FIG. 14. Here, the rotor magnet is magnetized by applying electric current to the coil wound around the magnetizing yoke that is disposed radially-inside the rotor magnet. Specifically, a manufacturing jig 250 includes a magnetizing ring (yoke member) 251, a presser member (second support portion) 252, insulating molds 253a and 253b, and a magnetizing yoke 254. The magnetizing ring is made of magnetic material, and includes a large diameter portion 251a and a small diameter portion (first support portion) 251b. In addition, a rotor magnet 207 is magnetized while a bottom surface 207c of the rotor magnet 207 is supported by the small diameter portion 251b and a top surface 207b of the rotor magnet 207 is secured by the presser member 252.

Figure 15:
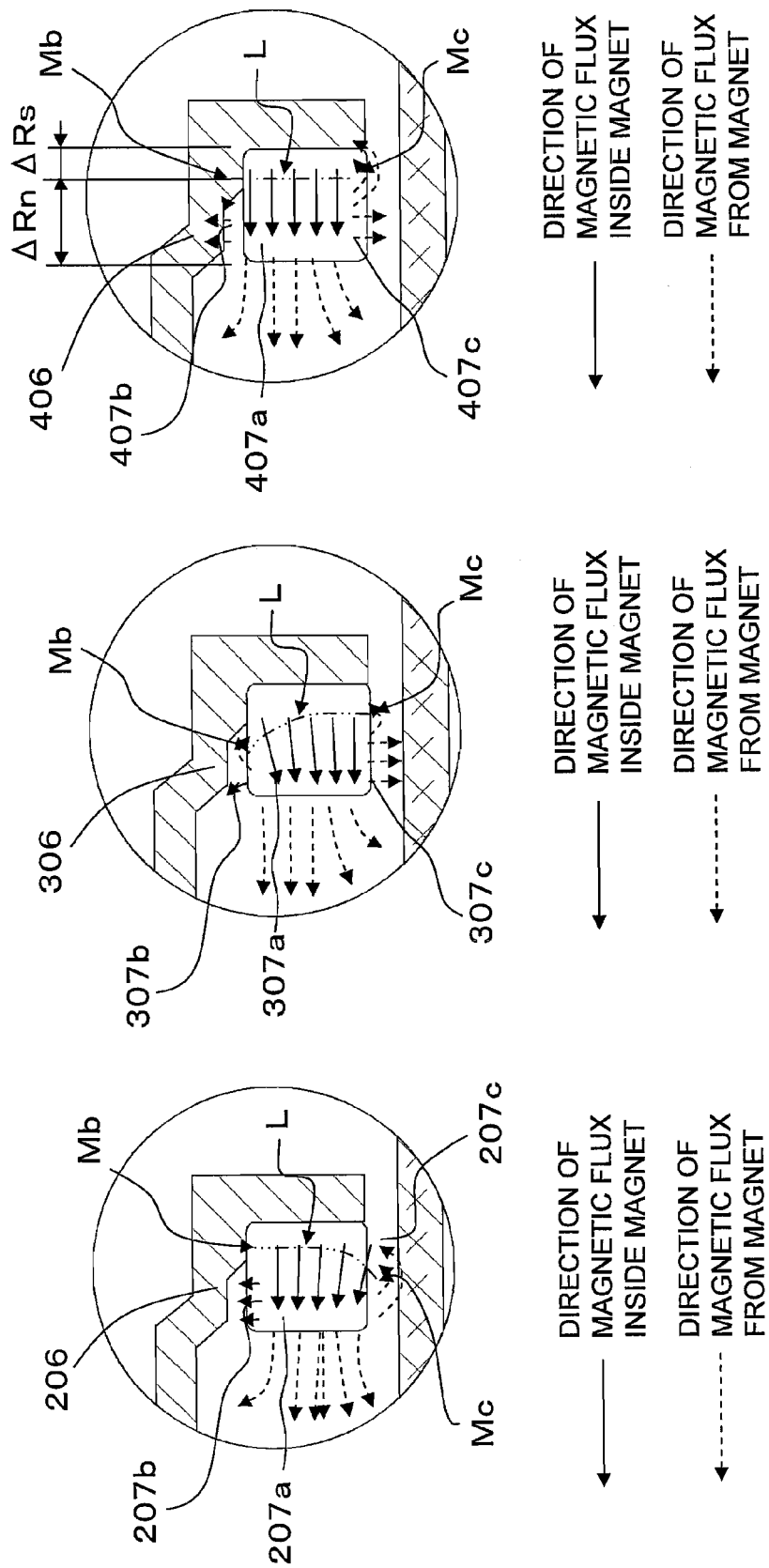
FIG. 15A is an enlarged diagram illustrating directions of magnetic flux inside and outside the rotor magnet illustrated in FIG. 16.
FIG. 15B is an enlarged diagram illustrating directions of magnetic flux inside and outside the rotor magnet illustrated in FIG. 17.
FIG. 15C is an enlarged diagram illustrating directions of magnetic flux inside and outside a conventional rotor magnet.

As illustrated in FIG. 15C, even when inner periphery magnetization is performed for a conventional rotor magnet, the interior of the magnet is approximately uniformly magnetized in the axial direction, and the magnetic polar boundary lines Mb and Mc, which circumferentially extend on the top and bottom surfaces, are located with approximately the same radius on the outer peripheral side of the rotor magnet (In this case, the rotor magnet is magnetized with the magnetizing yoke including the magnetizing coil on the inner periphery thereof. Therefore, magnetization on the inner peripheral side is greater than that on the outer peripheral side. Length delta-Rn ($\Delta$Rn) in the radius direction from the inner periphery of the rotor magnet to the circumferentially extending magnetic polar boundary lines Mb and Mc, and length delta-Rs ($\Delta$Rs) in the radius direction from the outer periphery of the rotor magnet to the circumferentially extending magnetic polar boundary lines Mb and Mc, follow a relation "$\Delta$Rs<$\Delta$Rn").

However, when the rotor magnet is magnetized with the magnetizing yoke of the present invention, the circumferentially extending magnetic polar boundary line on the top surface of the magnet, and the magnetic polar boundary line circumferentially extending on the bottom surface of the magnet are positioned on the radially different positions.

Figure 16:
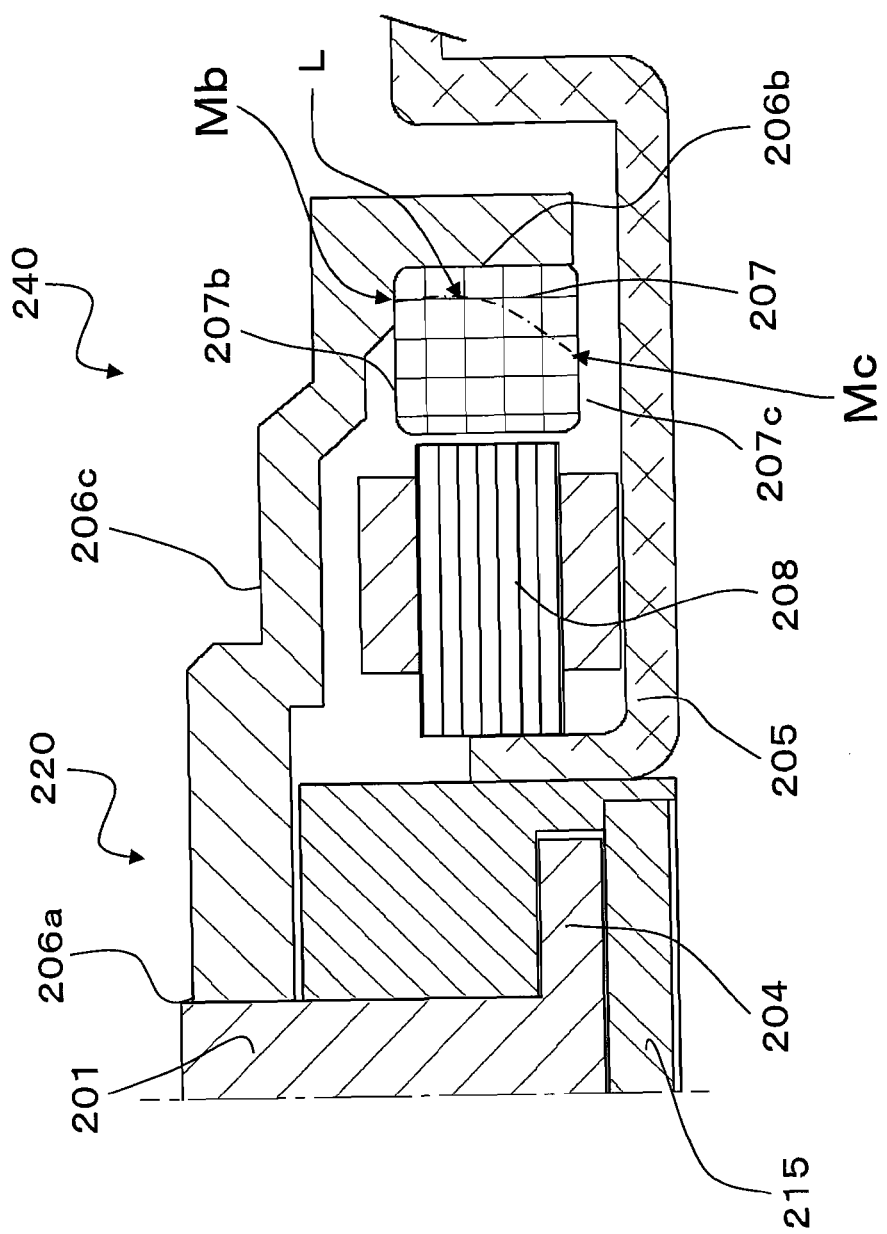
FIG. 16 is a cross-sectional view of a spindle motor in which a rotor magnet of an alternative embodiment of the present invention is mounted, and the rotor magnet is magnetized from the inner peripheral side, and a magnetic polar boundary line that circumferentially extends on a base side of the rotor magnet flows in a radially-inward direction.

For example, in a case of a spindle motor 240 illustrated in FIG. 16, it is possible to reduce attraction of the rotor magnet with respect to the base side. Here, as illustrated in FIG. 15A, a rotor magnet is attached to the spindle motor 240 such that the magnetic polar boundary line Mc, which circumferentially extends on the bottom surface 207c of the rotor magnet, is positioned radially-inside the magnetic polar boundary line Mb, which circumferentially extends on the top surface 207b of the rotor magnet.

With the configuration, axially-downward attraction is reduced, and abrasion generated between members in the thrust bearing unit is reduced during the start-up or the like. Accordingly, it is possible to apply it to, for instance, a spindle motor used for a server motor for which not an impact-resistant property but a long-lived property is demanded. Furthermore, it is possible to reduce electric current loss by reducing attraction, and accordingly it is possible to achieve low power consumption.

Figure 17:
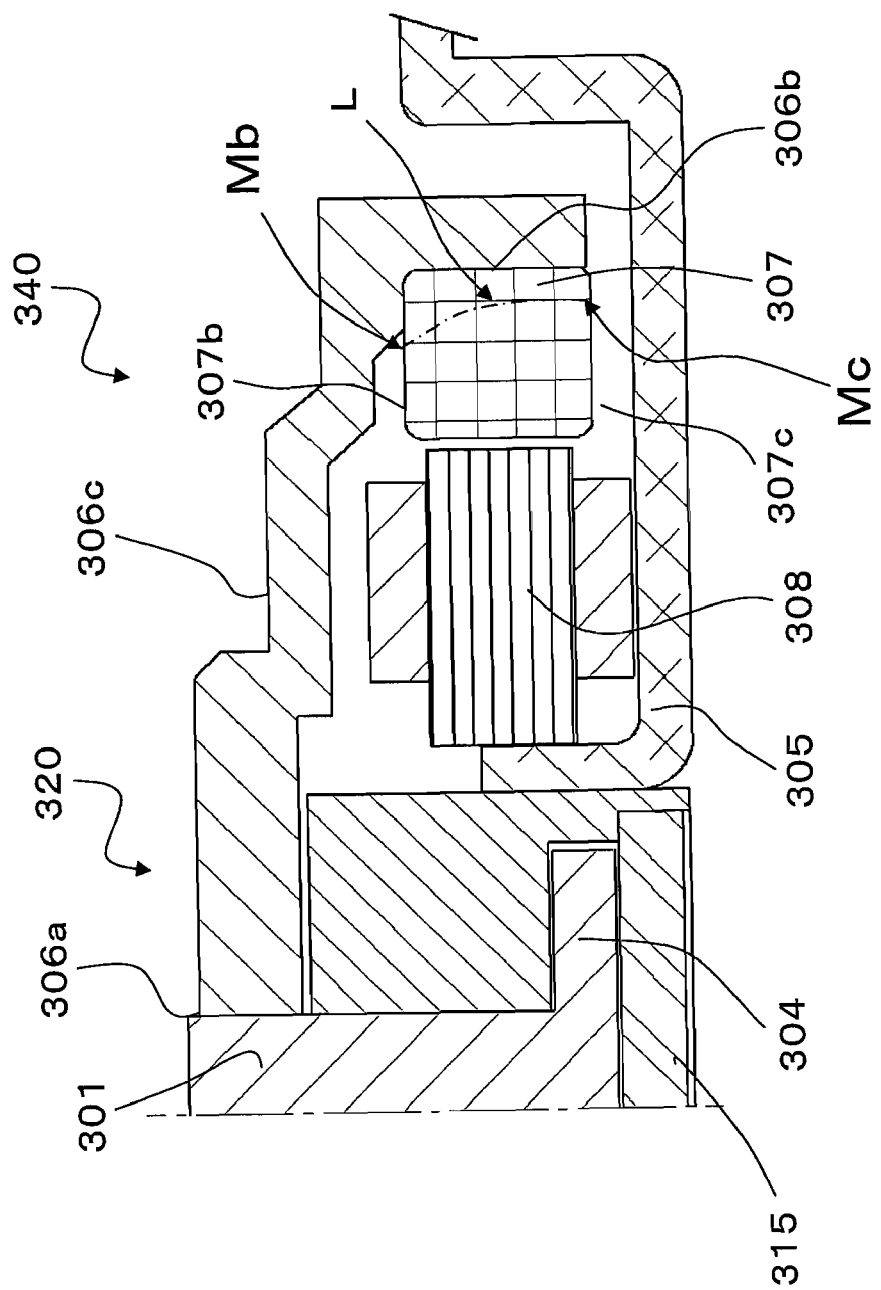
FIG. 17 is a cross-sectional view of a spindle motor in which a rotor magnet of an alternative embodiment of the present invention is mounted, and the rotor magnet is magnetized from the inner peripheral side, and a magnetic polar boundary line that circumferentially extends on the base side of the rotor magnet flows in a radially-outward direction.

Also, a spindle motor 340 illustrated in FIG. 17 may be used. Here, as illustrated in FIG. 15B, the rotor magnet 7 is attached to the spindle motor 340 in the opposite direction.

In this case, the leakage magnetic flux to the hub that is disposed on the axially-upper side is reduced, and adverse effect on the head unit (not illustrated in the figure) is reduced. Furthermore, axially-downward attraction becomes slightly greater than that of the conventional configuration.

Because of this, it is possible to enhance axial stiffness by increasing attraction, and it is also possible to reduce leakage magnetic flux to the axially upper side. As a result, it is possible to achieve a vibration-resistant and impact-resistant spindle motor in which the leakage magnetic flux to the head side is reduced.

Alternative Embodiment (D)

In the above described embodiment, a so-called axial rotation type spindle motor is exemplified as illustrated in the figures such as FIG. 3. Here, the shaft 1 and the rotor hub 6 are rotated as the rotational side member. However, the present invention is not limited to the configuration.

For example, it is possible to apply the present invention to a rotor hub mounted in a so-called axial fixed type spindle motor in which the shaft 1 is fixed to the base 5 and the rotor hub is attached to a sleeve that rotates with respect to the shaft.

Alternative Embodiment (E)

In the above described embodiment, a method for regulating radial positions of the magnetizing boundary lines Mb and Mc, which circumferentially extend on the top and bottom surfaces, by changing the direction of attachment of the rotor magnet, is exemplified. However, the present invention is not limited to the configuration.

For example, it becomes possible to farther finely regulate properties such as level of attraction and the amount of leakage magnetic flux by changing the diameter of the large-diameter portion 51b illustrated in FIGS. 7A and 7B. If a gap varies as a result of variation of assembly accuracy and accordingly attraction is reduced, it is possible to reduce the dimension of the large-diameter portion when a magnet corresponding to the lot is magnetized. Thus, it is possible to increase attraction by setting the magnetic polar boundary line Mc, which circumferentially extends on the bottom side of the magnet, to be positioned in a slightly radially-inward position. Accordingly, it is possible to stabilize the motor property. On the other hand, if attraction is increased, it is possible to reduce attraction by increasing the large-diameter dimension.

Alternative Embodiment (F)

In the above described embodiment, as illustrated in FIG. 7A, resin material is used as a second support portion of the rotor magnet. However, the present invention is not limited to the configuration.

Figure 18:
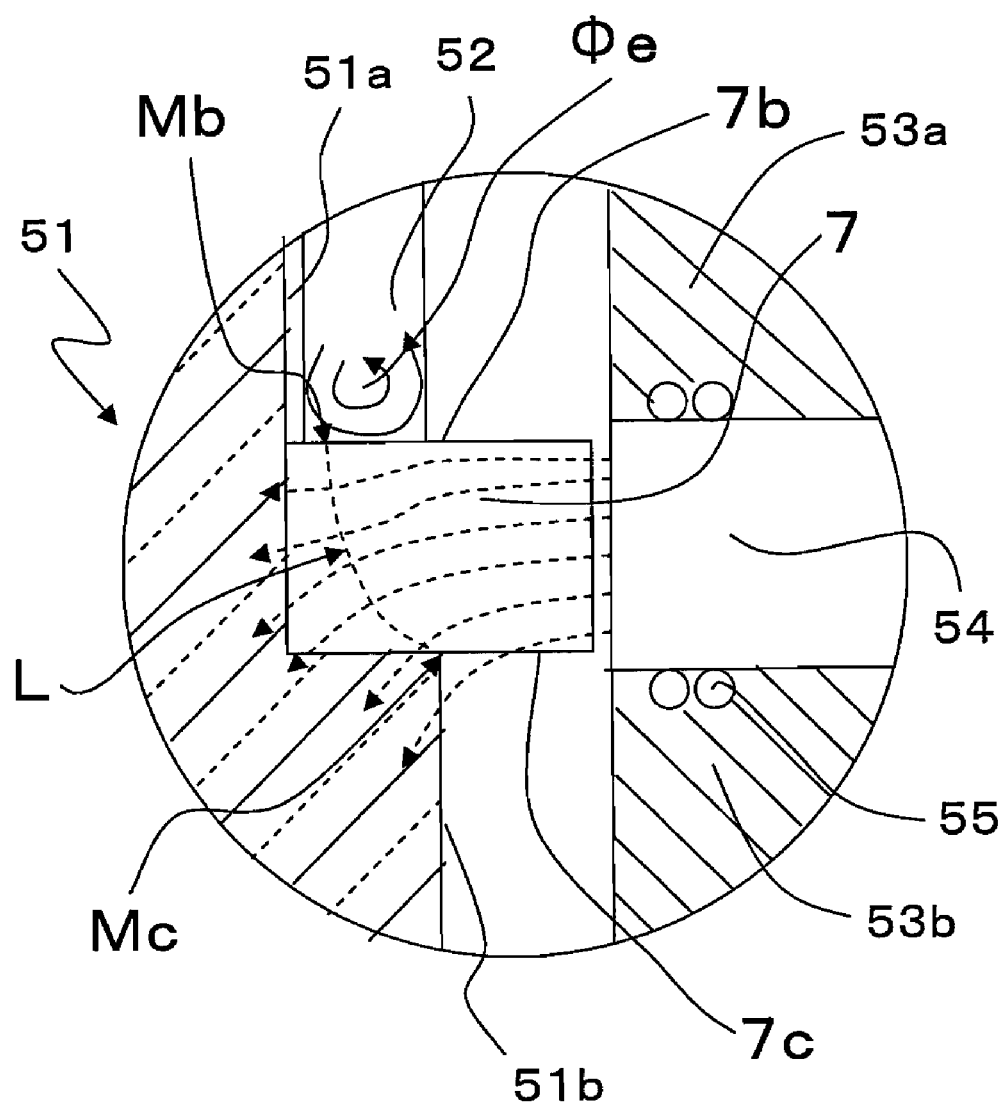
FIG. 18 is a schematic diagram in accordance with alternative embodiment of the present invention, which illustrates a state of magnetic flux when non-magnetic electrically-conductive material is used for a second support portion.

For example, it is possible to achieve the effect that the magnetic polar boundary line extending on the upper side is set to be positioned in an inward position by forming the second support portion with non-magnetic conductive material such as Cu and Al. With the configuration, it is possible to prevent eddy current from being generated in the second support portion and prevent the magnetic flux from passing through the interior of the second support portion, when the rotor magnet is magnetized from the outer periphery as illustrated in FIG. 18. As a result, it is possible to set the magnetic flux boundary line Mb on the upper side to be positioned in a farther inward position. When the top surface of the rotor magnet on which the magnetic flux boundary line Mb is positioned in an inward position is attached to be opposed to the base side, attraction of the rotor magnet with respect to the base is increased. Thus, it is possible to enhance axial stiffness.

Alternative Embodiment (G)

Figure 27:
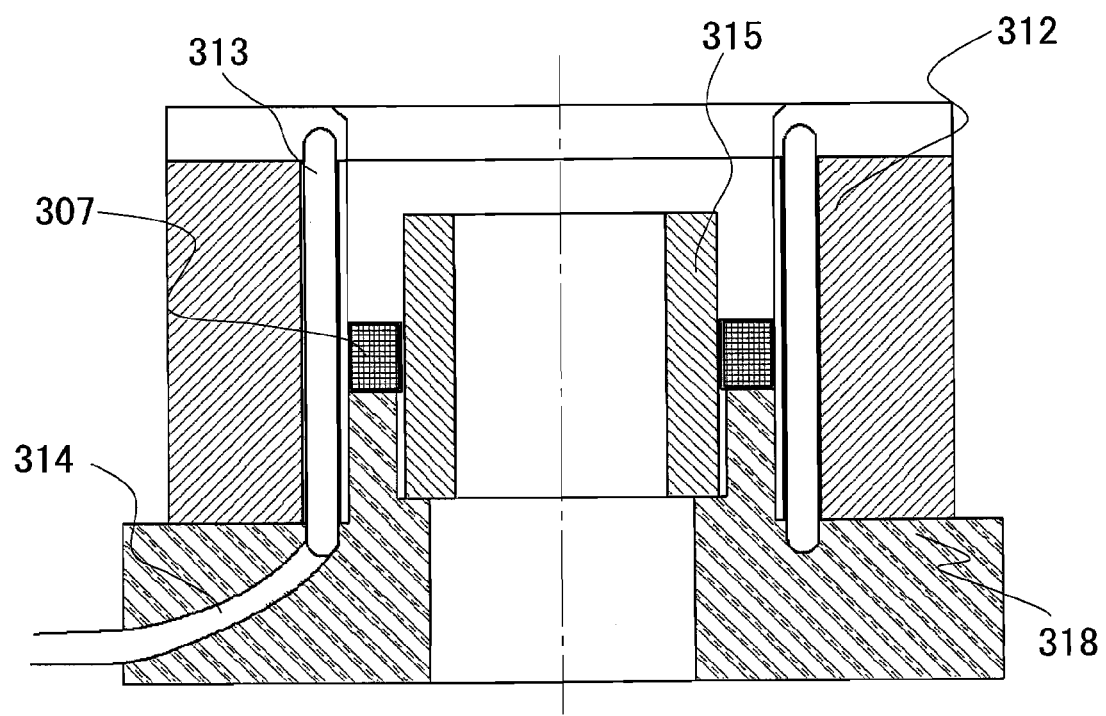
FIG. 27 is a cross-sectional view of another rotor magnet manufacturing jig of the second embodiment of the present invention.
Figure 28:
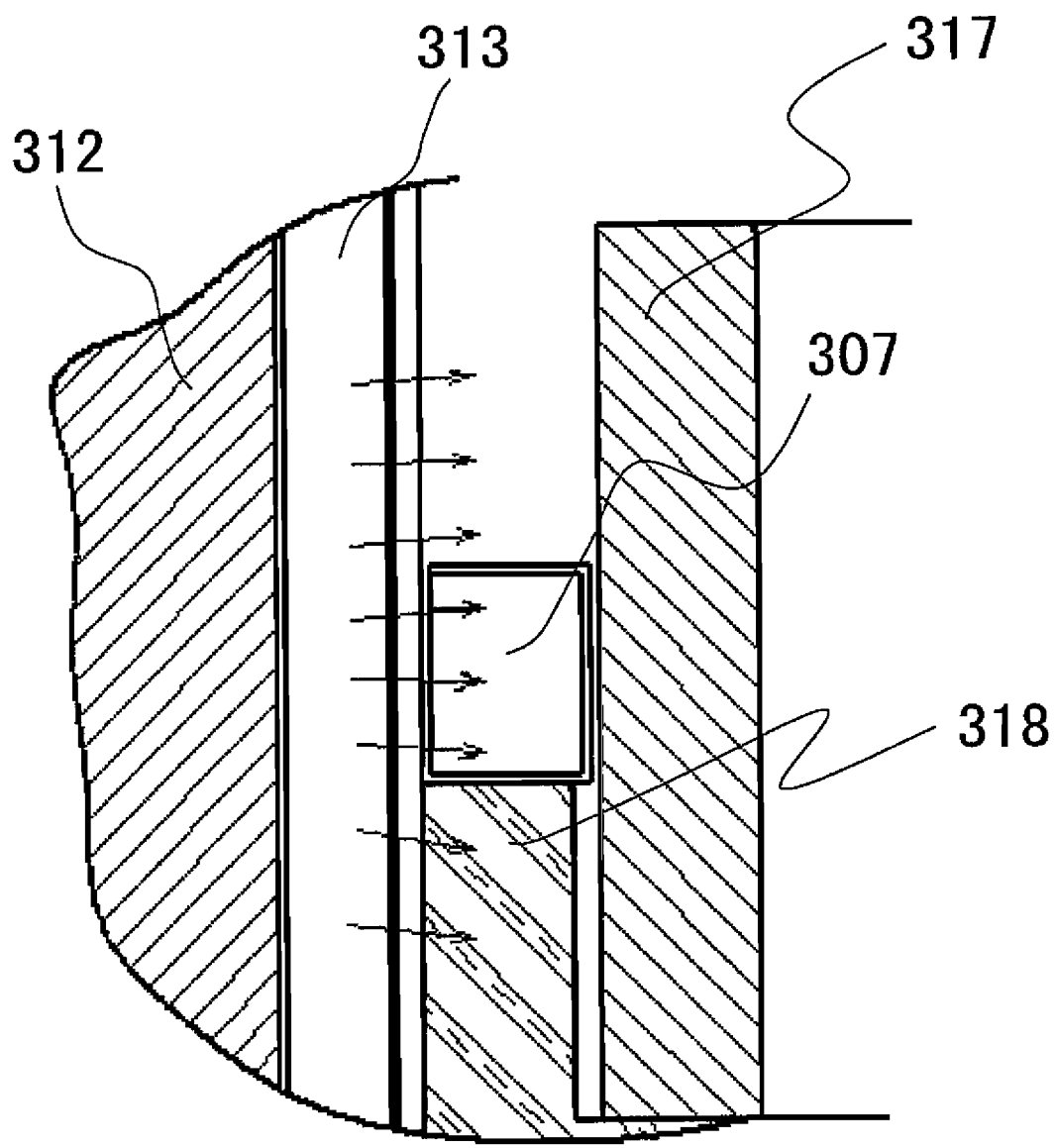
FIG. 28 is a detailed cross-sectional view of a rotor magnet section of another rotor magnet manufacturing jig of the second embodiment of the present invention.

Another type of rotor magnet manufacturing jig may be provided as illustrated in FIGS. 27 and 28. Here, the rotor magnet manufacturing jig includes a magnetizing ring 317 with dimension greater than the length of a rotor magnet 307 in the rotational axis direction.

In the configuration, the rotor magnet 307 is disposed to be opposed to an approximately center part of the magnetizing ring 317 in the rotational axis direction. Accordingly, magnetic flux that is generated from portions of a magnetizing yoke 312, which are positioned outside a portion thereof opposed to the rotor magnet 307, flows toward the magnetized ring 317 that is made of magnetic material and has magnetic permeability greater than that of the rotor magnet 307.

Because of this, the rotor magnet 307 is similarly magnetized to have a magnetizing component flowing in the axially-center direction on the outer peripheral surface of the rotor magnet 307 without concentration of the magnetic flux in the both end portions of the rotor magnet 307. Here, when height of the magnetic ring 317 is set to be greater than or equal to twice the height of the rotor magnet 307 in the rotational axis direction and the rotor magnet 307 is disposed to be opposed to the center part of the magnetizing ring 317 in the height direction, it is possible to completely eliminate impact by the magnetic field that is generated from the both end portions of the magnetizing yoke 312, which are positioned outside a portion thereof opposed to the rotor magnet 307 in the height direction.

Alternative Embodiment (H)

Figure 40:
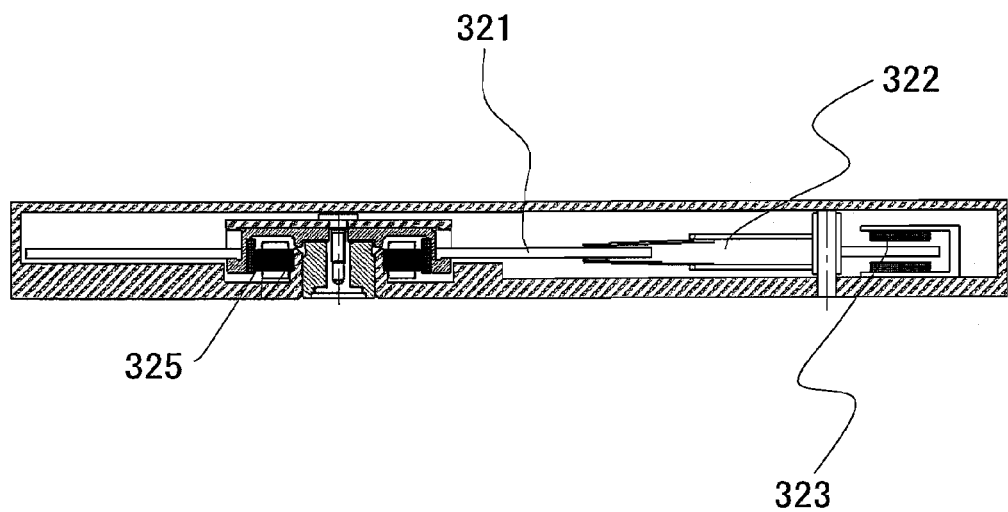
FIG. 40 is a diagram illustrating a magnetic recording device with a spindle motor of the present invention.

In the above described embodiment, the rotor magnet 7 to which the present invention is applied is exemplified as illustrated in the figures such as FIGS. 3 and 40. Here, the rotor magnet 7 is one of members forming the spindle motor 20 that is mounted in the HDD 40 functioning as a recording and reproducing apparatus. However, the present invention is not limited to the configuration.

For example, the spindle motor 20 may be mounted not only in the HDD but also in a variety of devices such as an optical magnetic disk device, an optical disk device, a floppy (registered trademark) disk device, a laser printer device, a laser scanner device, a video cassette recording device, and a data streaming device.

According to the rotor magnet of the present invention, it is possible to achieve an effect that attraction in a predetermined direction, which is generated by a rotor magnet mounted in a spindle motor, is allowed to be easily adjusted only by changing the direction of attaching the rotor magnet without disposing a separate member such as a ring member. Accordingly, it is possible to apply the present invention to a rotational device in which a rotor magnet is mounted.

The invention claimed is:

1. A rotor magnet being magnetized such that circumferentially adjacent magnetic poles are different from each other, the rotor magnet being configured to be attached to a rotational side member, the rotational side member being configured to rotate around a rotational axis of a spindle motor, said rotor magnet comprising:

an approximately annular main body having first and second end portions in a rotational axis direction, said main body being configured such that a first magnetic polar boundary line circumferentially extends on one of said first end portion and said second end portion of said main body, and said main body being configured such that a second magnetic polar boundary line circumferentially extends on the other of said first end portion and said second end portion of said main body, said first magnetic polar boundary line being positioned radially-outside said second magnetic polar boundary line.

2. A spindle motor, comprising:

the rotor magnet of claim 1;

said rotational side member to which the rotor magnet is attached;

a stator core around which a stator coil is wound, said stator core being disposed to be opposed to said rotor magnet in a radial direction;

a base retaining said stator core; and a bearing unit rotatably and relatively supporting said rotational side member with respect to said base.

3. A spindle motor comprising:

a rotor magnet being magnetized such that circumferentially adjacent magnetic poles are different from each other, said rotor magnet comprising an approximately annular main body having first and second end portions in a rotational axis direction, said main body being configured such that a first magnetic polar boundary line circumferentially extends on one of said first end portion and said second end portion of said main body, and said main body being configured such that a second magnetic polar boundary line circumferentially extends on the other of said first end portion and said second end portion of said main body, said first magnetic polar boundary line being positioned axially-outside said second magnetic polar boundary line;

a rotational side member to which said rotor magnet is attached, said rotational side member being configured to rotate around a rotational axis of said spindle motor;

a stator core around which a stator coil is wound, said stator core being disposed to be opposed to said rotor magnet in a radial direction;

a base retaining said stator core; and a bearing unit rotatably and relatively supporting said rotational side member with respect to said base, wherein said rotor magnet is attached to said spindle motor such that said first magnetic polar boundary line extending on one of said first end portion and said second end portion is on a side adjacent said base in the rotational axis direction, said second magnetic polar boundary line extending on said other of said first end portion and said second end portion is on a side opposite said side adjacent said base in the rotational axis direction, and said first magnetic polar boundary line is positioned radially-outside said second magnetic polar boundary line.

4. The spindle motor a rotor magnet being magnetized such that circumferentially adjacent magnetic poles are different from each other, said rotor magnet comprising an approximately annular main body having first and second end portions in a rotational axis direction, said main body being configured such that a first magnetic polar boundary line circumferentially extends on one of said first end portion and said second end portion of said main body, and said main body being configured such that a second magnetic polar boundary line circumferentially extends on the other of said first end portion and said second end portion of the main body, said first magnetic polar boundary line being positioned axially-outside said second magnetic polar boundary line;

a rotational side member to which said rotor magnet is attached, said rotational side member being configured to rotate around a rotational axis of said spindle motor;

a stator core around which a stator coil is wound, said stator core being disposed to be opposed to said rotor magnet in a radial direction;

a base retaining said stator core; and a bearing unit rotatably and relatively supporting said rotational side member with respect to said base, wherein said rotor magnet is attached to said spindle motor such that said first magnetic polar boundary line extending on one of said first end portion and said second end portion is on a side adjacent said base in the rotational axis direction, said second magnetic polar boundary line extending on said other of said first end portion and said second end portion is on a side opposite said side adjacent said base in the rotational axis direction, and said first magnetic polar boundary line is positioned radially-inside said second magnetic polar boundary line.

5. An information device, comprising:

said spindle motor of claim 2; and one of a disk-shaped recording medium, a rotation head, and a polygon mirror, the selected one of said disk-shaped recording medium, said rotation head, and said polygon mirror being attached to said spindle motor as an added member.

6. A rotor magnet manufacturing jig for the rotor magnet of claim 1, comprising:

a magnetizing yoke being disposed to make contact with the inner peripheral surface or the outer peripheral surface of said rotor magnet, said magnetizing yoke being configured to magnetize said rotor magnet;

a yoke member being disposed to make contact with the outer peripheral surface or the inner peripheral surface of said rotor magnet, said yoke member being made of magnetic material;

a first support portion supporting one of said first and second end portions of said main body of said rotor magnet in the rotational axis direction, said first support portion being made of magnetic material; and a second support portion supporting said other of said first and second end portions of said main body of the rotor magnet in the rotational axis direction, said second support portion being made of non-magnetic material.

7. The rotor magnet manufacturing jig of claim 6, wherein said first support portion is integrally formed with said yoke member.

* * * * *